(12) United States Patent
Kang et al.

(10) Patent No.: US 8,793,603 B2
(45) Date of Patent: Jul. 29, 2014

(54) IMAGE PROCESSING DEVICE, IMAGE PROCESSING METHOD, AND IMAGE PROCESSING PROGRAM

(75) Inventors: Woobum Kang, Osaka (JP); Masahiro Inomata, Osaka (JP); Shinya Takahashi, Osaka (JP)

(73) Assignee: Keyence Corporation, Osaka (JP)

( * ) Notice: Subject to any disclaimer, the term of this patent is extended or adjusted under 35 U.S.C. 154(b) by 387 days.

(21) Appl. No.: 13/267,169

(22) Filed: Oct. 6, 2011

(65) Prior Publication Data

US 2012/0105722 A1 May 3, 2012

(30) Foreign Application Priority Data

Oct. 29, 2010 (JP) ................................. 2010-244702

(51) Int. Cl.
*G06F 3/14* (2006.01)
(52) U.S. Cl.
USPC ........... 715/764; 715/700; 345/349; 345/419; 345/589; 348/349; 358/474; 386/96
(58) Field of Classification Search
USPC .......... 715/200–277, 700–867; 700/801–866; 709/201–229; 705/50–79; 345/30–111, 345/419, 589; 348/349; 358/474; 386/96
See application file for complete search history.

(56) References Cited

U.S. PATENT DOCUMENTS

| 2007/0053013 | A1* | 3/2007 | Takahashi ..................... 358/474 |
| 2007/0067723 | A1 | 3/2007 | Hosoda et al. |
| 2007/0140662 | A1 | 6/2007 | Nunomaki |
| 2007/0286579 | A1* | 12/2007 | Murabayashi et al. ......... 386/96 |
| 2009/0002485 | A1 | 1/2009 | Fujiwara |
| 2009/0009652 | A1* | 1/2009 | Sudo et al. ..................... 348/349 |
| 2009/0102938 | A1 | 4/2009 | Takahashi et al. |
| 2009/0189994 | A1 | 7/2009 | Shimonaka |
| 2010/0128054 | A1* | 5/2010 | Manabe ........................ 345/589 |
| 2011/0032252 | A1* | 2/2011 | Ohta ............................ 345/419 |

FOREIGN PATENT DOCUMENTS

| JP | 2004-312218 A | 11/2004 |
| JP | 2008-242812 A | 10/2008 |
| JP | 2009-008918 | 1/2009 |
| JP | 2009-017481 | 1/2009 |
| JP | 2009-032039 A | 2/2009 |
| JP | 2009-100326 | 5/2009 |
| JP | 2009-141709 | 6/2009 |
| JP | 2009-141710 | 6/2009 |
| JP | 2009-177537 | 8/2009 |
| JP | 2010-212966 A | 9/2010 |

\* cited by examiner

*Primary Examiner* — Ruay Ho
(74) *Attorney, Agent, or Firm* — Kilyk & Bowersox, P.L.L.C.

(57) ABSTRACT

The invention provides an image processing device, an image processing method, and an image processing program, which enable immediately and easily searching for images showing certain states of subjects. Image data of a plurality of frames for displaying images of the plurality of frames, and a plurality of evaluation values associated with the image data of the plurality of frames are stored in a storage unit. The image data of a frame is selected, out of the stored image data of the plurality of frames. The images based on the image data of the respective frames are displayed. A thumbnail image corresponding to the image data of the selected frames is displayed in a thumbnail display area in the display unit. If a thumbnail image is selected, an image of a frame corresponding to this thumbnail image is displayed.

13 Claims, 16 Drawing Sheets

IMAGE PROCESSING DEVICE, IMAGE PROCESSING METHOD, AND IMAGE PROCESSING PROGRAM

CROSS-REFERENCE TO RELATED APPLICATIONS

The present application claims foreign priority based on Japanese Patent Application No. 2010-244702, filed Oct. 29, 2010, the contents of which is incorporated herein by reference.

BACKGROUND OF THE INVENTION

1. Field of the Invention

The present invention relates to an image processing device, an image processing method, and an image processing program.

2. Description of Related Art

In laboratories, manufacturing sites, and the like, there have been employed high-speed image-pickup devices capable of picking up images of subjects at higher frame rates, in order to analyze movements of various types of subjects (works, devices, and the like). When an image of a subject is picked up by a camera, image data of a plurality of frames corresponding to images of a plurality of frames are successively acquired, and the acquired image data of the a plurality of frames are stored as moving-image data in a storage unit. Based on the image data stored in the storage unit, the images of the plurality of frames are displayed as a moving image of the subject, on a display unit such as a liquid crystal display panel. Using such a moving image, the movements of the subject are analyzed (refer to Japanese Unexamined Patent Publication No. 2009-141709, for example).

Japanese Unexamined Patent Publication No. 2009-141709 describes a high-speed image-pickup device which records images of a plurality of frames at a high speed during image pickup of a subject, and slowly reproduces the recorded images of the plurality of frames at a lower frame rate than that of image pickup. Therefore, by picking up an image of a subject using the high-speed image-pickup device, it is possible to observe momentary movements of the subject which cannot be visually recognized by humans.

In cases of observing certain momentary movements of a subject, a sufficiently-longer image-recording time period is set, in order to ensure recording of certain movements of the subject to be observed. Therefore, in order to search for portions showing such certain movements of the subject, out of recorded images of a plurality of frames, it is necessary to reproduce the recorded images for a longer time period.

SUMMARY OF THE INVENTION

An object of the present invention is to provide an image processing device, an image processing method, and an image processing program which enable immediately and easily searching for images showing certain states of subjects.

(1) An image processing device according to one embodiment of the present invention is an image processing device for displaying first images of a plurality of frames which form a moving image of an object, including: a storage unit adapted to store first image data of a plurality of frames for displaying the first images of the plurality of frames, and to store a plurality of evaluation values associated with the first image data of the plurality of frames; a display unit including a first display area and a second display area; a control unit adapted to display, in the first display area, the first images based on the first image data of the respective frames stored in the storage unit, select the first image data of some frames, out of the first image data of the plurality of frames based on the plurality of evaluation values stored in the storage unit, create second image data corresponding to the first image data of the selected frames, and display, in the second display area, second image based on the created second image data; and an operation unit adapted to be operated by a user, such that the user operates the operation unit for selecting the second image being displayed in the second display area; wherein the plurality of evaluation values are values which are varied according to a state of the object, the second image is image equivalent to the corresponding first images, and the control unit is adapted to, when the second image has been selected though the operation unit, display the first image corresponding to the selected second image, in the first display area.

With the image processing device, the first images are displayed in the first display area of the display unit, based on the first image data of the respective frames stored in the storage unit. The first image data of some frames are selected, out of the first image data of the plurality of frames, based on the plurality of evaluation values stored in the storage unit. The plurality of evaluation values are varied according to the state of the object. Therefore, the first image data of some frames are selected, based on the state of the object. The second image data corresponding to the first image data of the selected frames are created. Based on the created second image data, the second image equivalent to the corresponding first images are displayed, in the second display area.

A user can select the second image displayed in the second display area, by operating the operation unit. The first image corresponding to the selected second image is displayed in the first display area. This enables the user to immediately and easily search for first images showing a certain state of the object.

(2) The control unit may be adapted to select the first image data of the frame corresponding to an evaluation value indicating a predetermined characteristic, out of the plurality of evaluation values.

In this case, the first images based on the first image data of the selected some frames show the object being in a predetermined state. Therefore, the second image equivalent to the first image showing the object being in the predetermined state are displayed, in the second display area. This enables the user to immediately and easily search for images showing the object being in the predetermined state.

(3) The second image may be images created by reducing the corresponding first image.

In this case, if first image data of a plurality of frames are selected, a second image can be listed in the second display area. This enables the user to easily display first images showing the object being in a desired state in the first display area, by viewing the second image.

(4) The display unit may further include a third display area, and the control unit may be adapted to display, in the third display area, a waveform formed from the plurality of evaluation values stored in the storage unit, identify the frames of the first image corresponding to the second image displayed in the second display area, and display, in the third display area, indicators designating positions on the waveform which correspond to the first images of the identified frames.

In this case, the waveform formed from the plurality of evaluation values is displayed in the third display area, together with the indicators. Further, the frames of the first image corresponding to the second image displayed in the second display area are identified. The indicators designate the positions on the waveform which correspond to the first images of the identified frames.

This enables the user to recognize changes of the state of the object which are shown by the first images of the plurality of frames, by viewing the waveform. Further, the user can easily recognize the states of the object which correspond to the first images of the identified frames, by viewing the positions on the waveform which are designated by the indicators.

(5) The operation unit may be adapted to select the indicators displayed in the third display area, and the control unit may be adapted to, when the indicator displayed in the third display area has been selected through the operation unit, identify the frame of the first image corresponding to the position on the waveform which is designated by the selected indicator, and display the first image of the identified frame in the first display area.

In this case, the user can select the indicator displayed in the third display area, by operating the operation unit. The first image of the frame corresponding to the position on the waveform which is designated by the selected indicator is displayed in the first display area. This enables the user to immediately and easily search for first images showing a certain state of the object.

(6) The plurality of evaluation values may be values indicating characteristics of the first images of the plurality of frames.

The plurality of evaluation values are acquired from the first images of the plurality of frames. This eliminates the necessity of providing an additional device for acquiring the plurality of evaluation values. Accordingly, the structure of the system including the image processing device can be simplified.

(7) The values indicating the characteristics of the images of the plurality of frames may be values relating to luminances of the images of the plurality of frames.

The luminances of the first images are varied according to the state of the object. Accordingly, the plurality of evaluation values are varied according to the state of the object. Therefore, the first image data of some frames corresponding to a certain state of the object are easily and properly selected, based on the values relating to the luminances of the first images of the plurality of frames.

(8) The plurality of evaluation values may be the values of outputs from a detection device for detecting a value which is varied with the change of the state of the object.

In this case, the state of the object can be reliably detected by the detection device. Accordingly, based on the values of outputs from the detection device, first image data of some frames corresponding to the certain state of the object can be easily and properly selected.

(9) The operation unit may be adapted to issue a command for reproduction and reverse reproduction of a moving image, and the control unit may be adapted to successively display images of a plurality of frames, by using the first image displayed in the first display area as a reference, based on the plurality of first image data stored in the storage unit, when a command for reproduction or reverse reproduction of a moving image has been issued through the operation unit.

In this case, the user can generate a command for reproduction and reverse reproduction of a moving image. If a command for reproduction or reverse reproduction of a moving image is issued, images of a plurality of frames are successively displayed, by using the first image being displayed in the first display area as a reference, based on the plurality of first image data stored in the storage unit. Thus, the moving image can be reproduced or reversely reproduced. This enables the user to easily observe a certain state of the object and states of the object before and after the certain state.

(10) The control unit may be adapted to select first image data of frames, out of the first image data of the plurality of frames, based on the plurality of evaluation values stored in the storage unit, such that the number of the frames of the selected first image data is equal to or less than a predetermined number.

In this case, the number of the frames of the selected first image data does not exceed the predetermined number. This enables displaying a second image with a size equal to or more than a certain size, in the second display area. This enables the user to easily observe the state of the object in second image.

(11) The control unit may be adapted to create a moving-image file containing the first image data of the plurality of frames, the plurality of evaluation values associated with the first image data of the plurality of frames, data indicating the selected first image data, and the second image data corresponding to the selected first image data, and may be adapted to store the created image-moving file in the storage unit.

In this case, the first image data of the plurality of frames, the plurality of evaluation values, the data indicating the selected first image data, and the second image data can be integrally treated as a moving-image file. This makes it easier to treat the first image data of the plurality of frames, the plurality of evaluation values, the data indicating the selected first image data, and the second image data.

(12) An image processing method according to another embodiment of the present invention is an image processing method for displaying first images of a plurality of frames which form a moving image of an object, in a first display area in a display unit, including the steps of; storing first image data of a plurality of frames for displaying the first images of the plurality of frames, and storing a plurality of evaluation values associated with the first image data of the plurality of frames; selecting the first image data of some frames, out of the first image data of the plurality of frames, based on the stored plurality of evaluation values; and creating second image data corresponding to the first image data of the selected frames, and displaying second image based on the created second image data, in a second display area in the display unit; displaying, when the second image displayed in the second display area has been selected, the first image corresponding to the selected second image in the first display area of the display unit; wherein the plurality of evaluation values are values which are varied according to a state of the object, and the second image is image equivalent to the corresponding first images.

With this image processing method, the first image data of some frames are selected, out of the first image data of the plurality of frames, based on the stored plurality of evaluation values. The plurality of evaluation values are varied according to the state of the object. Therefore, the first image data of some frames are selected based on the state of the object. The second image data corresponding to the first image data of the selected frames are created. Based on the created second image data, the second image equivalent to the corresponding first images are displayed, in the second display area.

The second image displayed in the second display area is selected. The first image corresponding to the selected second image is displayed in the first display area. This enables the user to immediately and easily search for first images showing a certain state of the object.

(13) An image processing program according to yet another embodiment of the present invention is an image processing program for causing a processing device to execute image processing for displaying first images of a plurality of frames which form a moving image of an object, in a first display area in a display unit, the program being adapted to cause the processing device to execute the processes of: storing first image data of a plurality of frames for displaying the first images of the plurality of frames, and storing a plurality of evaluation values associated with the first image data of the plurality of frames; selecting the first image data of some frames, out of the first image data of the plurality of frames, based on the stored plurality of evaluation values; and creating second image data corresponding to the first image data of the selected frames and displaying second image based on the created second image data, in a second display area in the display unit; displaying, when the second image displayed in the second display area has been selected, the first image corresponding to the selected second image in the first display area of the display unit; wherein the plurality of evaluation values are values which are varied according to a state of the object, and the second image is image equivalent to the corresponding first images.

With this image processing program, the first image data of some frames are selected, out of the first image data of the plurality of frames, based on the stored plurality of evaluation values. The plurality of evaluation values are varied according to the state of the object. Therefore, the first image data of some frames are selected based on the state of the object. The second image data corresponding to the first image data of the selected frames are created. Based on the created second image data, the second image equivalent to the corresponding first images are displayed, in the second display area.

The second image displayed in the second display area is selected. The first image corresponding to the selected second image is displayed in the first display area. This enables the user to immediately and easily search for first images showing a certain state of the object.

According to the present invention, it is possible to enable immediately and easily search for images showing certain states of subjects.

DETAILED DESCRIPTION OF PREFERRED EMBODIMENTS

Hereinafter, there will be described an image processing device, an image processing method, and an image processing program according to an embodiment of the present invention, with reference to the drawings. As will be described later, the image processing device according to the present embodiment includes a display unit. The display unit is adapted to continuously display images of a plurality of frames for displaying moving images.

(1) Basic Structure of Image Processing System

Figure 1:
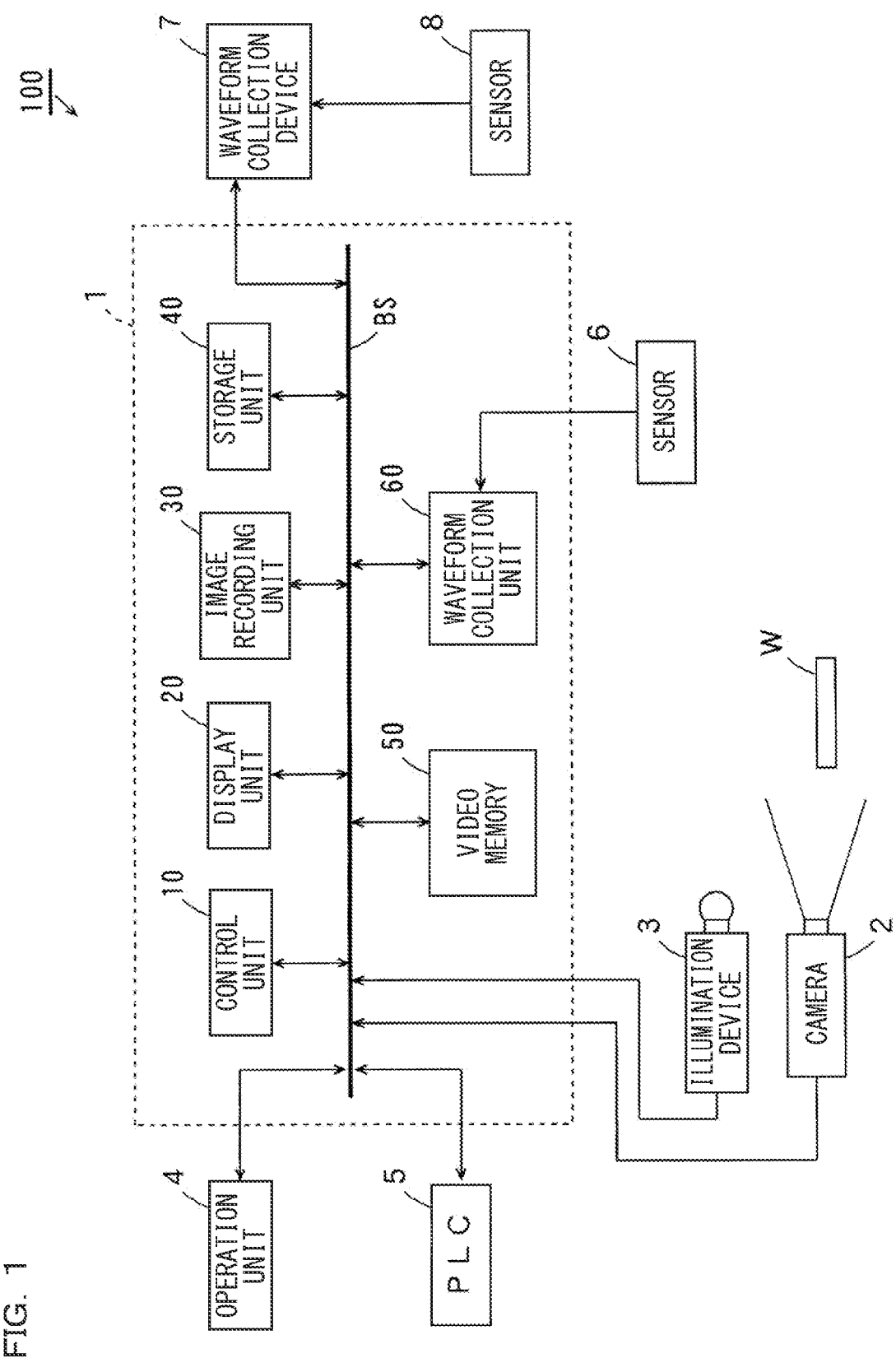
FIG. 1 is a block diagram illustrating a structure of an image processing system according to an embodiment of the present invention.

FIG. 1 is a block diagram illustrating a structure of an image processing system 100 according to an embodiment of the present invention. As illustrated in FIG. 1, the image processing system 100 includes an image processing device 1, a camera 2, an illumination device 3, and an operation unit 4. The image processing device 1 includes a control unit 10, a display unit 20, an image recording unit 30, a storage unit 40, a video memory 50, a waveform collection unit 60, a bus BS, and a plurality of interfaces (not illustrated). The control unit 10, the display unit 20, the image recording unit 30, the storage unit 40, the video memory 50, and the waveform collection unit 60 are connected to the bus BS. The camera 2, the illumination device 3, and the operation unit 4 are connected to the bus BS through respective interfaces.

A PLC (Programmable Logic Controller) 5, a sensor 6, and a waveform collection device 7 can be connected to the image processing device 1. A sensor 8 can be connected to the waveform collection device 7. The details thereof will be described later.

The camera 2 includes an image pickup device, such as a CCD (charge-coupled device) image sensor or a CMOS (complementary metal oxide semiconductor) image sensor. A user can set the light-exposure time (shutter speed), the image-pickup frame rate, and the like of the image pickup device, using the operation unit 4. The image-pickup frame rate refers to the number of frames of images to be captured per unit time. Further, in the present embodiment, the camera 2 is capable of picking up images of a subject W at image-pickup frame rates in the range of not less than 15 fps (frame per second) and not more than 32000 fps.

If image-pickup is performed on the subject W by the camera 2, the image pickup device captures images of the subject W at the set image-pickup frame rate, and then, the captured images are outputted as image data. Thus, image data of a plurality of frames corresponding to images of the plurality of frames are supplied from the camera 2 to the image processing device 1. A moving image is formed from the images of the plurality of frames. Hereinafter, image data of a plurality of frames will be referred to as moving-image data.

The camera 2 is mounted on a supporting table (not shown) such as a tripod together with the illumination device 3. The illumination device 3 includes a light source, such as a metal halide lamp or a high power LED (light-emitting diode). The illumination device 3 is used for irradiating the subject W with light. When the subject W has sufficient brightness, the illumination device 3 is not necessary.

The video memory 50 is constituted by a memory, such as a RAM (Random Access Memory). The video memory 50 is successively supplied with image data of a plurality of frames from the camera 2, the image recording unit 30, or the storage unit 40. Such supplied image data of a plurality of frames are successively stored in the video memory 50.

The display unit 20 is constituted by, for example, a liquid crystal display panel or an organic EL (electroluminescence) panel. The display unit 20 is caused to sequentially display, thereon, images of a plurality of frames, based on image data of a plurality of frames having been successively stored in the video memory 50. This causes the display unit 20 to display moving images thereon.

The operation unit 4 is constituted by a pointing device, such as a mouse or a trackball. The operation unit 4 may be constituted by a key board, a remote controller, or a touch panel, together with the pointing device or in place of the pointing device. The operation unit 4 may also be formed integrally with the image processing device 1.

The image recording unit 30 is constituted by a memory, such as a RAM. The image recording unit 30 includes a moving-image data storage area for storing moving-image data formed from a plurality of pieces of image data, and a waveform-data storage area for storing waveform data formed from a plurality of evaluation values. Such waveform data formed from a plurality of evaluation values will be described later, in detail.

Storing image data of a plurality of frames (moving-image data) supplied from the camera 2 into the moving-image data storage area in the image recording unit 30 is referred to as "image recording". The user can perform image recording of moving images of the subject W picked up by the camera 2, by operating the operation unit 4. In the present embodiment, during image recording processes, a plurality of evaluation values (waveform data) supplied from the waveform collection unit 60 are stored in the waveform-data storage area in the image recording unit 30, at the same time.

The storage unit 40 is constituted by a large-capacity storage device, such as a hard disk. The user can create a moving-image file containing moving-image data and waveform data stored in the image recording unit 30 and can store the created moving-image file in the storage unit 40, by operating the operation unit 4. Further, an image processing program according to the present embodiment is stored in the storage unit 40. The image processing program will be described later in detail.

The waveform collection unit 60 collects waveform data formed from a plurality of evaluation values and supplies the collected waveform data to the image recording unit 30. These plurality of evaluation values are values which are varied according to the state of the subject W in images of a plurality of frames. Such a state of the subject W is the position, the orientation, the brightness, the size, the shape, the colors, or the like of the subject W.

An evaluation value is an average luminance value of the image of each frame including the subject W picked up by the camera 2 (an average luminance value over a plurality of pixels constituting the image of each frame), for example. In this case, the waveform collection unit 60 successively calculates average luminance values of the images of the respective frames, as evaluation values, based on the image data of the respective frames having been successively supplied from the camera 2 to the image recording unit 30. The plurality of successively-calculated average luminance values are stored, as waveform data, in the waveform-data storage area in the image recording unit 30. In this case, the plurality of evaluation values can be obtained, in synchronization with the image data of the plurality of frames. Accordingly, the number of a plurality of evaluation values per unit time is equal to the number of image data of a plurality of frames per unit time. An evaluation value may be either the total sum of luminance values of the image of each frame, the difference between the total sum of luminance values of the image of each frame and the total sum of luminance values of the image of the subsequent frame, or dispersion of luminance values in each frame. Further, an evaluation value may be the difference between the total sum of luminance values of the image of a reference frame and the total sum of luminance values of the image of each frame.

The waveform collection unit 60 may be adapted to acquire, as evaluation values, the values of output signals from the sensor 6, during acquisition of image data of a plurality of frames. In this case, a plurality of evaluation values can be acquired with the same period as that of image data of the plurality of frames or a different period therefrom. Accordingly, the number of a plurality of evaluation values per unit time does not always agree with the number of image data of a plurality of frames per unit time. In cases where a plurality of evaluation values are acquired with a period shorter than that of image data of a plurality of frames, more than one evaluation value are associated with image data of each frame. In cases where a plurality of evaluation values are acquired with a period longer than that of image data of a plurality of frames, each evaluation value is associated with image data of more than one frame.

In cases where the sensor 6 is a temperature sensor, a distance sensor, a pressure sensor, an acceleration sensor, a displacement sensor, or the like, the waveform collection unit 60 successively acquires, as evaluation values, measured values of the temperature, the distance, the pressure, the acceleration, the displacement, or the like of a to-be-measured object, and the acquired plurality of evaluation values are stored, as waveform data, in the waveform-data storage area of the image recording unit 30.

Further, in cases of employing a microphone, in place of the sensor 6, the waveform collection unit 60 successively acquires sound signals, as evaluation values, and the acquired plurality of sound signals are stored, as waveform data, in the waveform-data storage area of the image recording unit 30.

Further, referring to FIG. 1, the waveform collection device 7 connected to the image processing device 1 has the same structure as that of the waveform collection unit 60. Therefore, in cases where the waveform collection device 7 is connected to the image processing device 1, the waveform collection device 7 successively acquires, as evaluation values, the values of output signals from the sensor 8, and the acquired plurality of evaluation values are stored, as waveform data, in the waveform-data storage area of the image recording unit 30.

The control unit 10 is constituted by, for example, a CPU (Central Processing Unit), a ROM (Read Only Memory) and a RAM. The CPU in the control unit 10 controls the operations of the camera 2, the illumination device 3, and the other components in the image processing device 1, based on user's operations on the operation unit 4. Further, the CPU in the control unit 10 executes, in the RAM, the image processing program stored in the storage unit 40. The ROM stores a system program.

(2) Basic Operations of Image Processing System

There will be described basic operations of the image processing system 100 in FIG. 1.

(2-1) Setting of Image-Pickup Conditions

Figure 2:
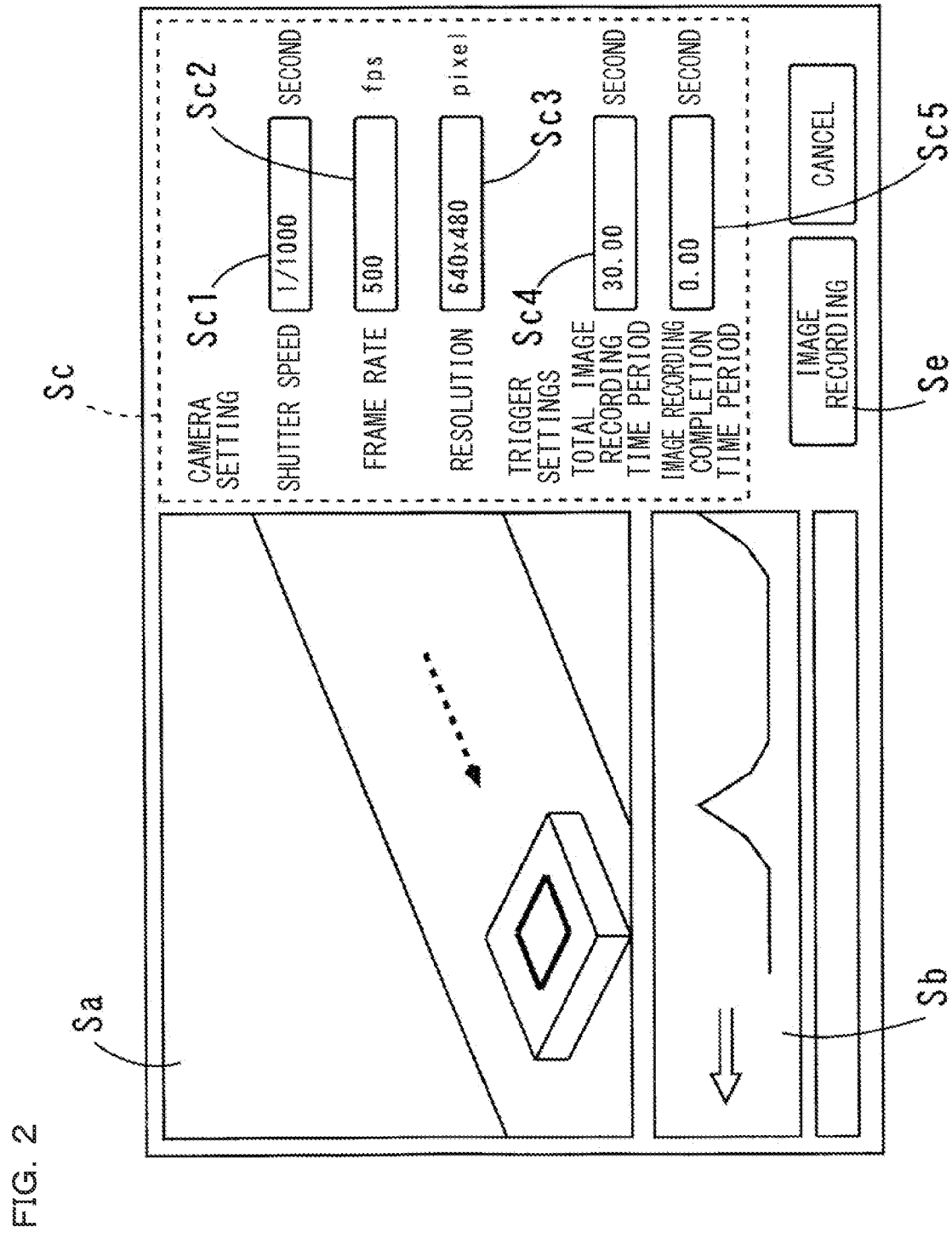
FIG. 2 is a view illustrating an exemplary display on a display unit at the time of setting image-pickup conditions.

The user sets image-pickup conditions of the camera 2, by operating the operation unit 4. FIG. 2 is a view illustrating an exemplary display on the display unit 20 at the time of setting the image-pickup conditions. As illustrated in FIG. 2, at the time of setting the image-pickup conditions, an image display area Sa, a waveform display area Sb, a condition setting area Sc, and an image recording button Se are displayed on the display unit 20.

In the image display area Sa, images based on image data stored in the video memory 50 are displayed. In the waveform display area Sb, a graph of a waveform based on waveform data collected by the waveform collection unit 60 is displayed. The horizontal axis of the waveform graph is a time axis, while the vertical axis represents evaluation values.

In the condition setting area Sc, basic image-pickup conditions of the camera 2 are displayed. A plurality of input frames Sc1, Sc2, and Sc3 for setting image-pickup conditions are displayed therein, wherein these image-pickup conditions are the shutter speed, the image-pickup frame rate, and the resolution, for example. The user inputs respective values of the shutter speed, the image-pickup frame rate, and the resolution, in the input frames Sc1, Sc2, and Sc3, using the operation unit 4. Based on the respective values inputted in the input frames Sc1, Sc2, and Sc3, the control unit 10 sets the shutter speed, the image-pickup frame rate, and the resolution of the camera 2.

Further, in the present embodiment, it is possible to supply, to the control unit 10, a trigger signal which forms a reference for the timing of completion of an image recording process, which will be described later, according to user's operations on the operation unit 4, for example. In the condition setting area Sc, input frames Sc4 and Sc5 for making trigger settings for the control unit 10 based on such a trigger signal are further displayed.

The user inputs, in the input frames Sc4 and Sc5, values of a total image-recording time period and an image-recording completion time period which will be described later, respectively, using the operation unit 4. Based on the respective values inputted in the input frames Sc4 and Sc5, the control unit 10 performs trigger settings. The trigger settings will be described in detail.

In the present embodiment, the trigger settings refers to defining the storage time period over which image data is to be stored in the image recording unit 30 through a single image-recording process (hereinafter, referred to as "total image-recording time period"), and further, defining the time period from the time point at which a trigger signal is supplied to the control unit 10 until the completion of the image-recording process (hereinafter, referred to as "image-recording completion time period").

For example, in cases of making the trigger settings by setting the total image-recording time period to 30 seconds and by setting the image-recording completion time period to 0 second, an image recording process is completed at the time point at which a trigger signal is supplied to the control unit 10, after the start of the image recording. Thus, moving-image data and waveform data acquired within the time interval from 30 seconds before the time point of the supply of the trigger signal to the control unit 10 to the time point of the supply of the trigger signal thereto are stored in the image recording unit 30.

On the other hand, in cases of making the trigger settings by setting the total image-recording time period to 30 seconds and by setting the image-recording completion time period to 30 seconds, an image-recording process is completed at the time point at which 30 seconds has elapsed since the time point of the supply of the trigger signal to the control unit 10, after the start of the image recording. Thus, moving-image data and waveform data acquired within the time interval from the time point of the supply of the trigger signal to the control unit 10 until the elapse of 30 seconds since then are stored in the image recording unit 30.

Further, in cases of making trigger settings by setting the total image-recording time period to 30 seconds and by setting the image-recording completion time period to 15 seconds, an image-recording process is completed at the time point at which 15 seconds has elapsed since the time point of the supply of the trigger signal to the control unit 10. Thus, moving-image data and waveform data acquired within the time interval from 15 seconds before the time point of the supply of the trigger signal to the control unit 10 until the elapse of 30 seconds since then are stored in the image recording unit 30.

Further, instead of setting the aforementioned total image-recording time period, as a trigger setting, the total number of frames of image data to be stored in the image recording unit 30 through an image recording process can be set. Further, instead of setting the aforementioned image-recording completion time period, as a trigger setting, the number of frames of image data to be stored in the image recording unit 30 after the time point of supply of a trigger signal can be set.

Also, the PLC 5 may be adapted to supply trigger signals to the control unit 10. In this case, for example, trigger signals can be supplied to the control unit 10, with a period which has been preliminarily set in the PLC 5 or in response to timings of certain operations of an external apparatus connected to the PLC 5. Also, output signals from various types of sensors can be supplied, as trigger signals, to the control unit 10.

If the user operates the image-recording button Se using the operation unit 4, the control unit 10 starts an image-recording process, which will be described later.

(2-2) Image Recording Process

Figure 3A:
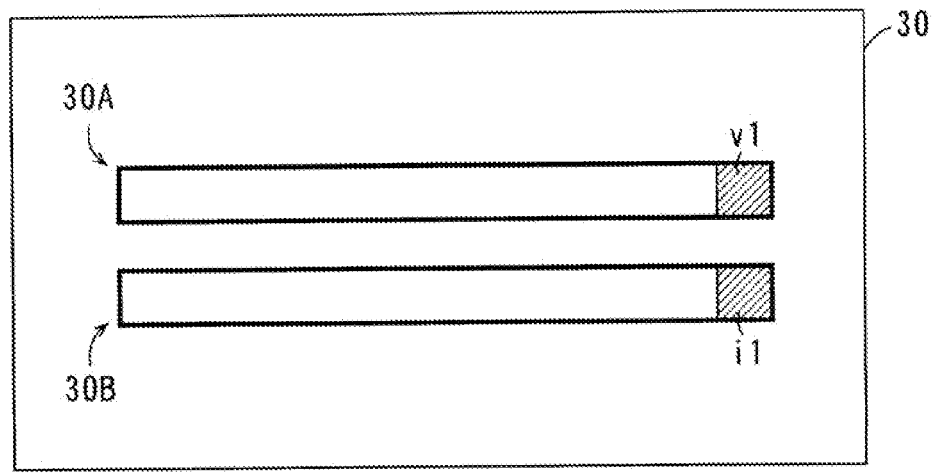
FIGS. 3A to 3C are schematic views illustrating storage states of an image recording unit in FIG. 1, during an image recording process.
Figure 3B:
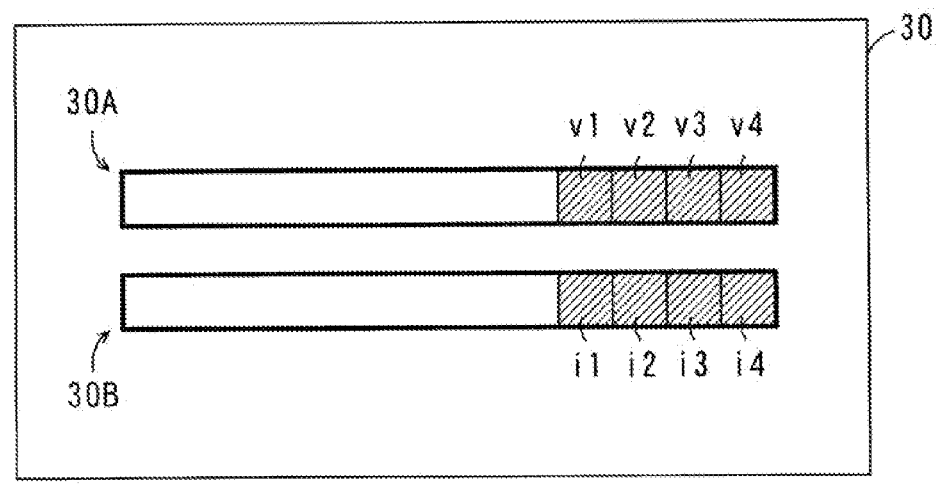
Figure 3C:
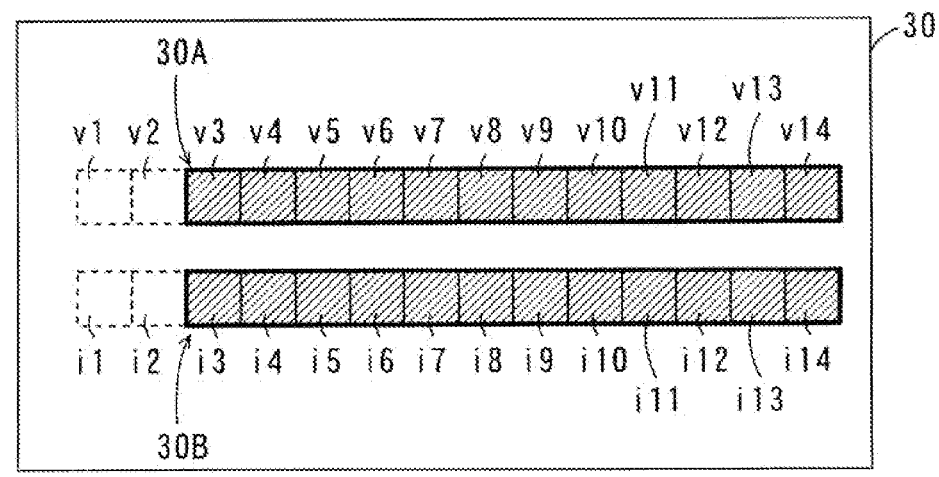

FIGS. 3A to 3C are schematic views illustrating storage states of the image recording unit 30 in FIG. 1, during an image recording process. As described above, the image recording unit 30 is provided with a moving-image data storage area 30A for storing moving-image data (image data of a plurality of frames), and a waveform-data storage area 30B for storing waveform data (a plurality of evaluation values).

In the image processing device 1, as illustrated in FIG. 3A, if the image-recording button Se in FIG. 2 is operated, the control unit 10 starts an image recording process. In the image recording process, image data v1 corresponding to an image of a first frame supplied from the camera 2 is stored in the moving-image data storage area 30A in the image recording unit 30. Further, a first evaluation value i1 supplied from the waveform collection unit 60 is stored in the waveform-data storage area 30B in the image recording unit 30.

Subsequently, as illustrated in FIG. 3B, image data v2, v3, and v4 corresponding to images of second, third, and fourth frames supplied from the camera 2 are stored, in order, in the moving-image data storage area 30A in the image recording unit 30, and further, the image data v1, v2, v3, and v4 shift, in order, in the moving-image data storage area 30A. At the same time, second, third, and fourth evaluation values i2, i3, and i4 supplied from the waveform collection unit 60 are stored, in order, in the waveform-data storage area 30B in the image recording unit 30, and also, these evaluation values i1, i2, i3, and i4 shift in order in the waveform-data storage area 30B.

If the amount of image data stored in the moving-image data storage area 30A exceeds the storage capacity of the moving-image data storage area 30A during the image recording process, the image data of the oldest frame stored in the moving-image data storage area 30A is eliminated, every time image data of a most recent frame (current frame) is newly stored in the moving-image data storage area 30A.

Similarly, if the amount of evaluation values stored in the waveform-data storage area 30B exceeds the storage capacity of the waveform-data storage area 30B during the image recording process, the oldest evaluation value stored in the waveform-data storage area 30B is eliminated, every time a most recent evaluation value is newly stored in the waveform-data storage area 30B.

In the example of FIG. 3C, in a state where twelve pieces of image data v1 to v12 are stored in the moving-image storage area 30A, two pieces of image data v13 and v14 are further stored, in order, therein and, therefore, the oldest image data v1 and v2 are eliminated therefrom, in order. Further, in a state where twelve evaluation values it to i12 are stored in the waveform-data storage area 30B, two image evaluation values i13 and i14 are stored in order therein and, thus, the oldest evaluation values i1 and i2 are eliminated therefrom, in order. As a result thereof, the image data v3 to v14 are stored in the moving-image data storage area 30A, and the evaluation values i3 to i14 are stored in the waveform-data storage area 30B.

As described above, during image recording processes, moving-image data and waveform data are successively stored in a so-called ring buffer format, in the moving-image data storage area 30A and the waveform-data storage area 30B.

In the example of FIG. 3C, the evaluation values i3 to i14 stored in the waveform-data storage area 30B are in one-to-one correspondence with the image data v3 to v14 stored in the moving-image data storage area 30A. In cases where a plurality of evaluation values are acquired with a different period from that of image data of a plurality of frames, as described above, the evaluation values stored in the waveform-data storage area 30B are not in one-to-one correspondence with the image data stored in the moving-image data storage area 30A.

Figure 4:
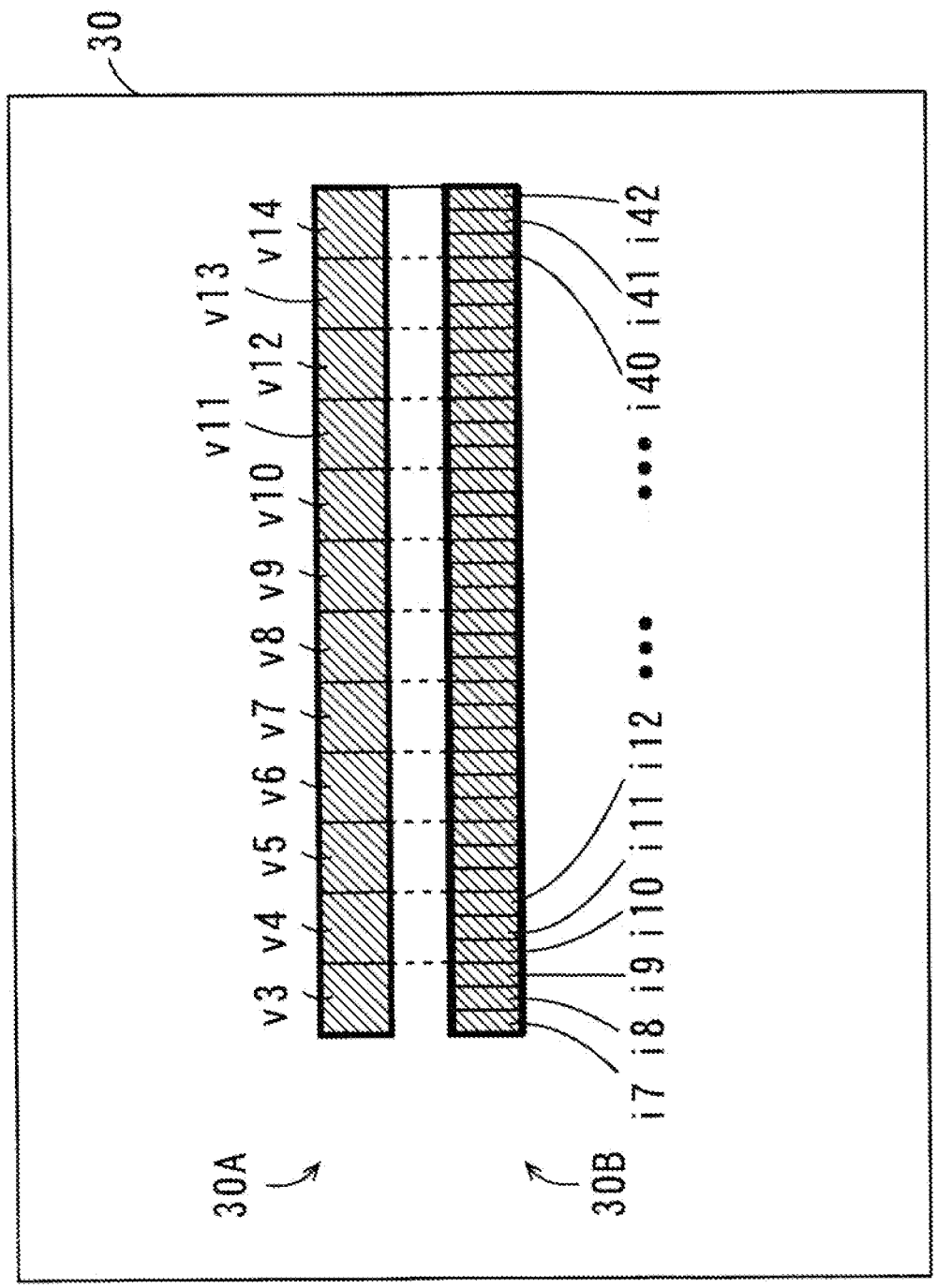
FIG. 4 is a schematic view illustrating another exemplary storage state of the image recording unit in FIG. 1, during the image recording process.

FIG. 4 is a schematic view illustrating another exemplary storage state of the image recording unit 30 in FIG. 1, during an image recording process. In the example of FIG. 4, a plurality of evaluation values are acquired with a shorter period than that of image data of a plurality of frames. Therefore, the evaluation values i7 to i42 stored in the waveform-data storage area 30B are not in one-to-one correspondence with the image data v3 to v14 stored in the moving-image data storage area 30A. Continuous three evaluation values correspond to image data of a single frame. For example, the evaluation values i7, i8, and i9 correspond to the image data v3, and the evaluation values i10, i11, and i12 correspond to the image data v4.

In cases where a plurality of evaluation values are acquired with a longer period than that of image data of a plurality of frames, each evaluation value corresponds to image data of a plurality of frames.

Figure 5:
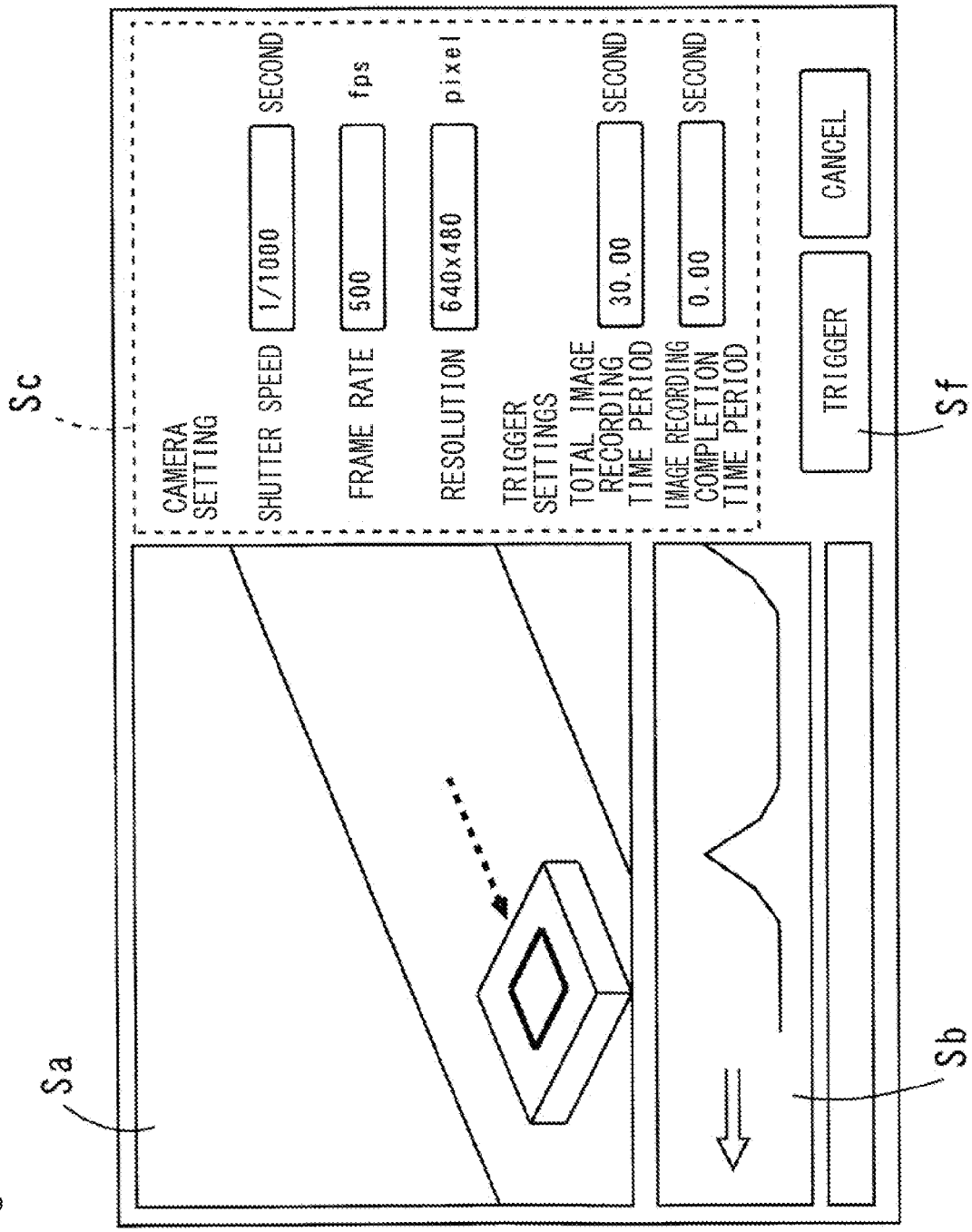
FIG. 5 is a view illustrating an exemplary display on the display unit during the image recording process.

FIG. 5 is a view illustrating an exemplary display on the display unit 20 during an image recording process. As illustrated in FIG. 5, a trigger button Sf is displayed on the display unit 20, instead of the image-recording button Se in FIG. 2, during the image-recording process.

If the user operates the trigger button Sf by using the operation unit 4, a trigger signal is supplied to the control unit 10. As described above, this causes the image recording process to be completed at timing based on the trigger settings.

(2-3) File Storage Process

Figure 6:
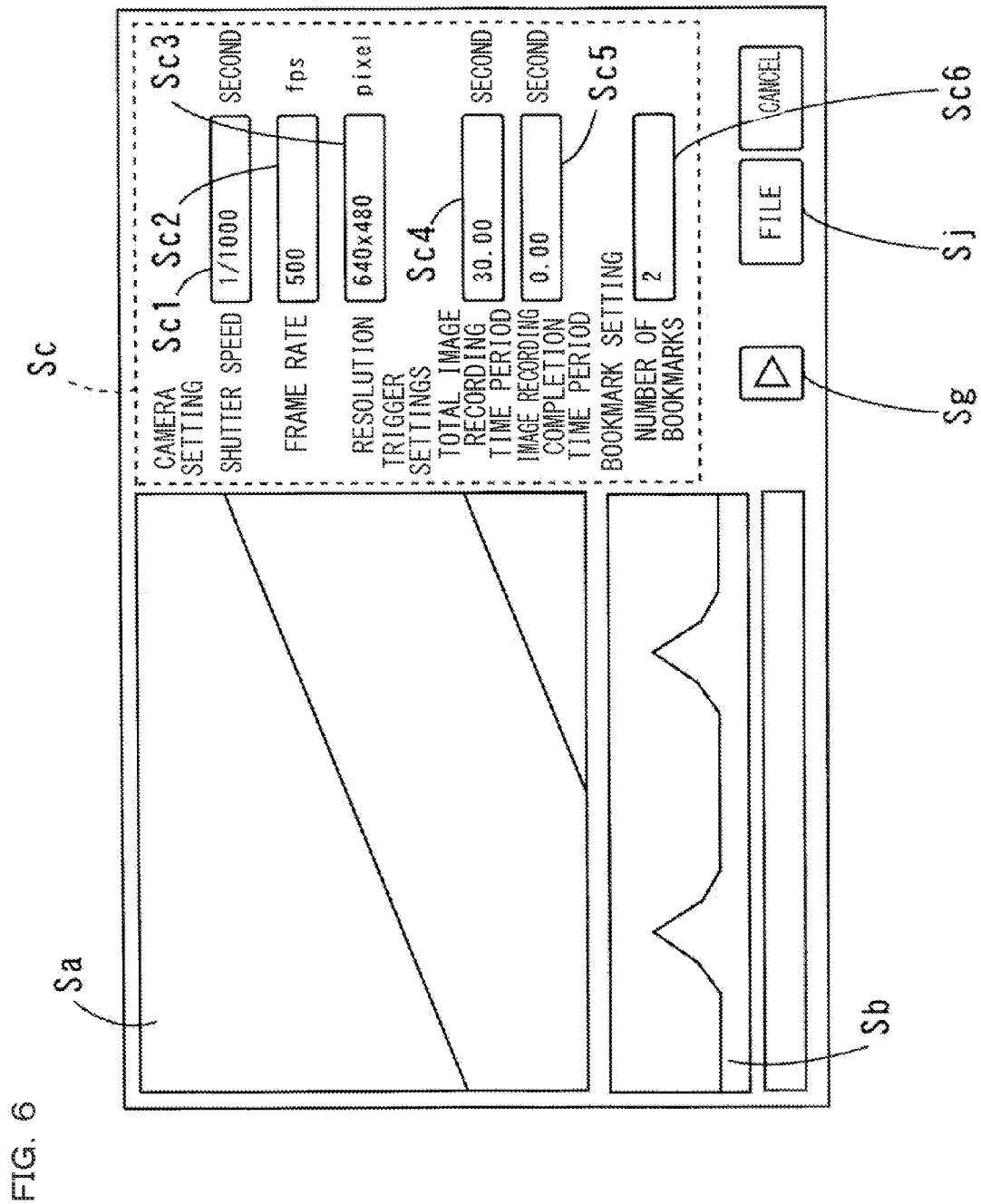
FIG. 6 is a view illustrating an exemplary display on the display unit when the image recording process has been completed.

FIG. 6 is a view illustrating an exemplary display on the display unit 20 when an image recording process has been completed. As illustrated in FIG. 6, when the image recording process has been completed, a file button Sj and a reproduction button Sg are displayed on the display unit 20, instead of the trigger button Sf in FIG. 5.

If the user operates the file button Sj by using the operation unit 4, the control unit 10 performs a file storage process. In the file storage process, the control unit 10 selects image data of some frames, out of image data of a plurality of frames stored in the moving-image data storage area 30A, based on waveform data stored in the waveform-data storage area 30B. Further, in the file storage process, a moving-image file containing the moving-image data and the waveform data stored in the image recording unit 30 is created, and the created moving-image file is stored in the storage unit 40 in FIG. 1.

In the condition setting area Sc, an input frame Sc6 for inputting an upper limit value on the number of frames of image data which can be selected during a file storage process (hereinafter, referred to as "selection upper limit number") is further displayed, in addition to the input frames Sc1 to Sc5. Based on the value inputted in the input frame Sc6, the control unit 10 sets the selection upper-limit number.

Figure 7:
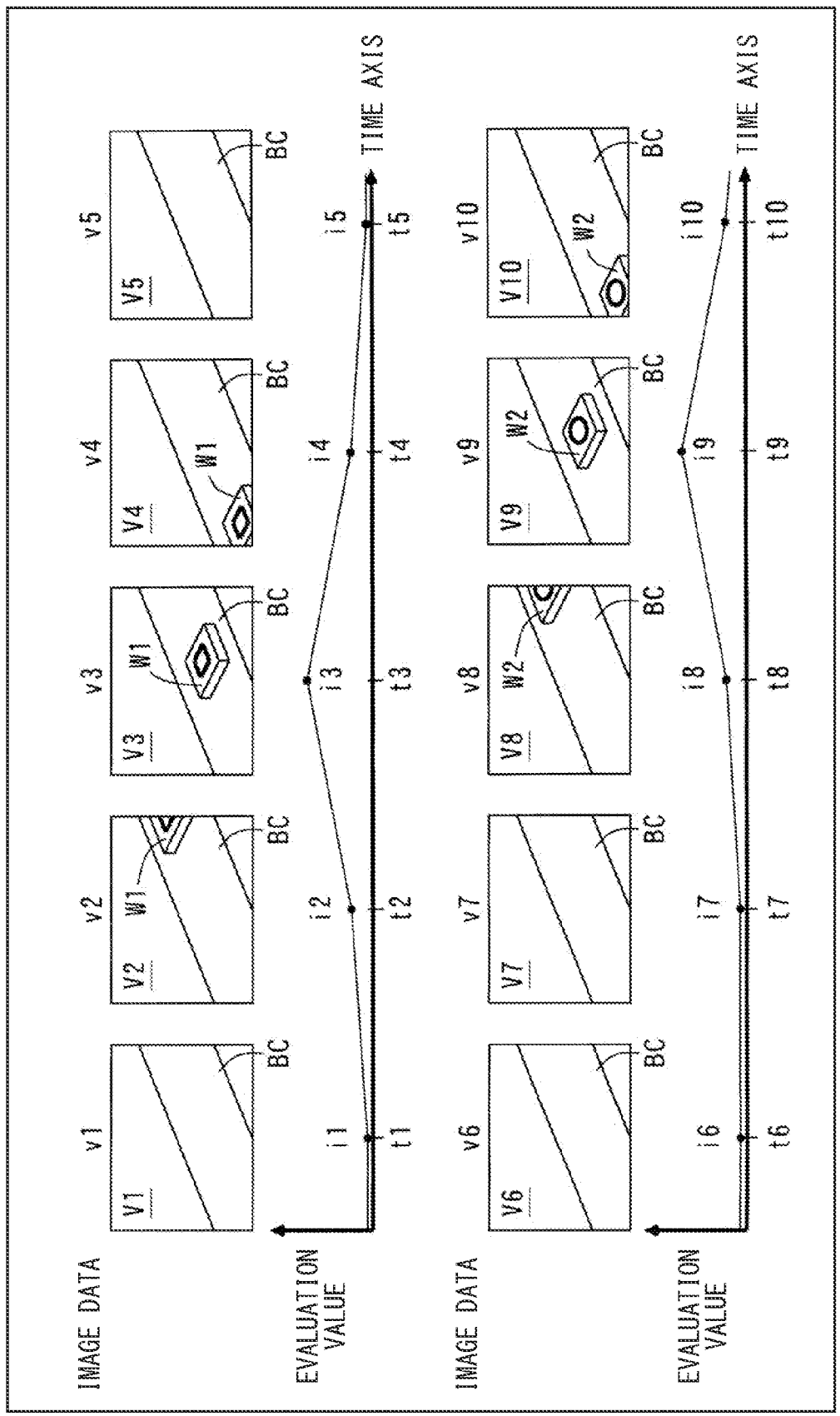
FIG. 7 is a conceptual view illustrating an example of image data of a plurality of frames stored in a moving-image data storage area, and the relationship between a plurality of evaluation values stored in a waveform-data storage area and images of the plurality of frames based on the image data of the plurality of frames.

The file storage process will be described, in detail, along with specific examples. FIG. 7 is a conceptual view illustrating an example of image data of a plurality of frames stored in the moving-image data storage area 30A, and the relationship between a plurality of evaluation values stored in the waveform-data storage area 30B and images of a plurality of frames based on the image data of the plurality of frames.

Image data v1 to v10 in FIG. 7 are stored in the moving-image data storage area 30A in the image recording unit 30 in FIG. 3, and evaluation values it to i10 in FIG. 7 are stored in the waveform-data storage area 30B.

In an upper stage of FIG. 7, images V1 to V5 corresponding to the image data v1 to v5 of the first to fifth frames are illustrated, in the mentioned order, along a time axis in the left-to-right direction. In a lower stage of FIG. 7, images V6 to V10 corresponding to the image data v6 to v10 of the sixth to tenth frames are illustrated, in the mentioned order, along a time axis in the left-to-right direction. In the present example, the images V1 to V10 have been acquired, by picking up images of two subjects W1 and W2 being transferred by a belt conveyer BC, with a predetermined interval interposed therebetween.

Referring to FIG. 7, the time axis in the upper stage is continued at its right end to the left end of the time axis in the lower stage. The first to tenth evaluation values i1 to i10 are associated with the image data v1 to v10 of the first to tenth frames. Below the images V1 to V10 of the first to tenth frames, a graph of a waveform formed from the first to tenth evaluation values i1 to i10 is displayed.

In the example of FIG. 7, the images V2, V3, V4, V8, V9, and V10 show a portion or the entirety of the subjects W1 and W2 being transferred by the belt conveyer BC. In the present example, each evaluation value is the difference between the total sum of luminance values of the image of the first frame and the total sum of luminance values of the image of each frame. In this case, the evaluation values i3 and i9 corresponding to the images V3 and V9 showing the entire subjects W1 and W2 are largest.

Figure 8:
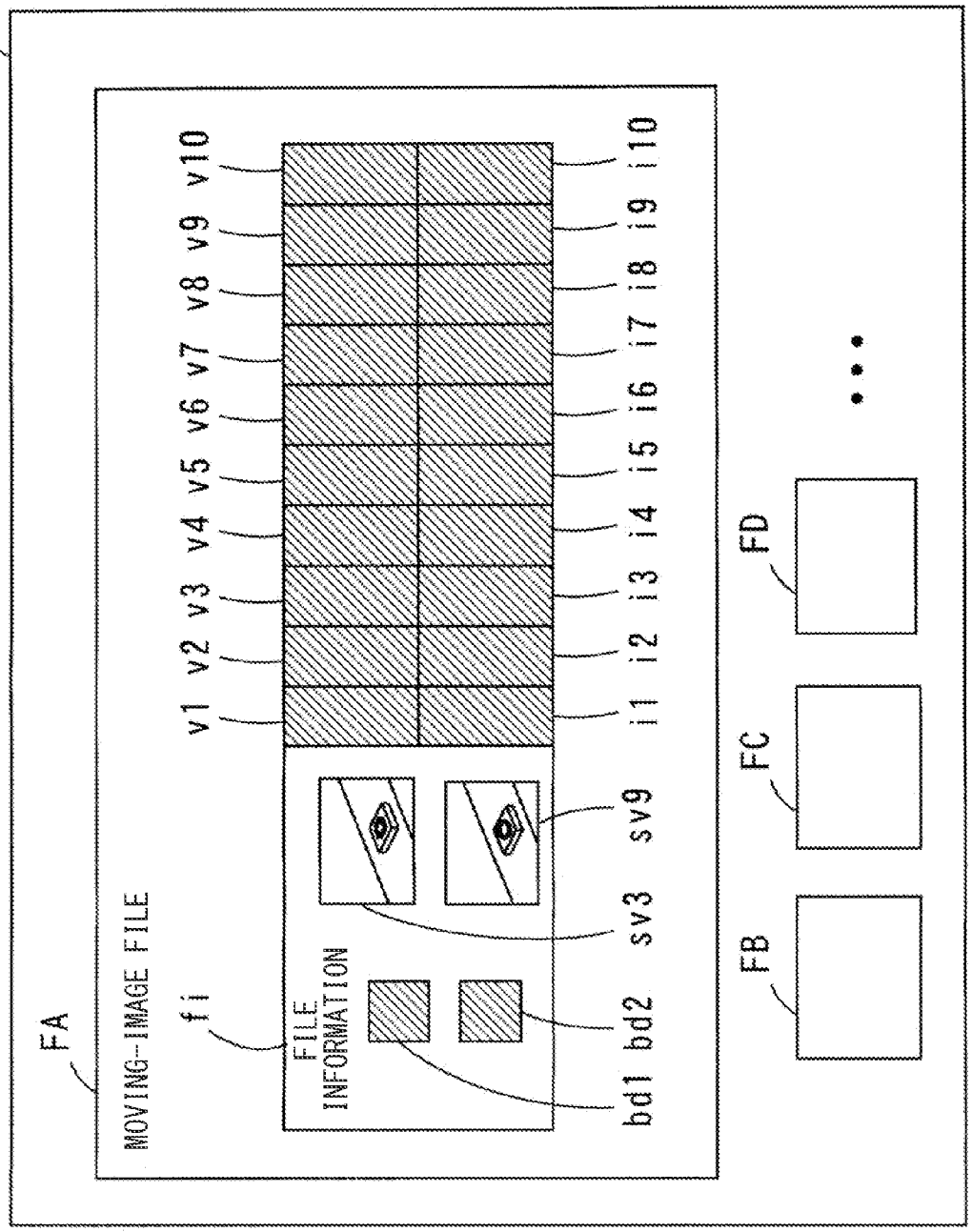
FIG. 8 is a schematic view of a moving-image file created through a file storage process.

FIG. 8 is a schematic view of a moving-image file created through the file storage process. In the aforementioned file storage process, if "2" is inputted in the input frame Sc6 in FIG. 6, for example, the control unit 10 sets the selection upper limit number to 2. The control unit 10 acquires the image data v1 to v10 of the plurality of frames from the moving-image data storage area 30A in the image recording unit 30, and also acquires the evaluation values it to i10 corresponding to the image data v1 to v10 of the plurality of frames from the waveform-data storage area 30B in the image recording unit 30.

The control unit 10 extracts one or more evaluation values indicating a predetermined characteristic, out of the acquired evaluation values. The predetermined characteristic may be either defined based on the magnitude relationship among a plurality of evaluation values or defined based on the magnitude relationship between the plurality of evaluation values and a certain threshold value.

In the present example, largest evaluation values are extracted, in descending order of magnitude, out of the plurality of evaluation values, such that the number of the extracted evaluation values is equal to the selection upper limit number. Thus, two evaluation values i3 and i9 are extracted, in the present example.

Subsequently, the control unit 10 creates bookmark data indicating the image data of the frames corresponding to the extracted evaluation values. In the present example, bookmark data bd1 and bd2 indicating the respective image data v3 and v9 corresponding to the two evaluation values i3 and i9 are created.

Further, the control unit 10 creates image data indicated by the bookmark data, as characteristic image data. In the present example, characteristic image data sv3 and sv9 corresponding to the image data v3 and v9 are created.

The characteristic image data are data for displaying, on the display unit 20, images equivalent to the images (hereinafter, referred to as the original images) based on the corresponding image data. The images equivalent to the original images are images which enable identifying of the original images corresponding to these equivalent images. For example, the images equivalent to the original images include reduced images (hereinafter, referred to as thumbnail images) created by reducing the original images with a certain reduction ratio in the longitudinal and lateral directions, enlarged images created by enlarging the original images with a certain enlargement ratio in the longitudinal and lateral directions, images created by enlarging or reducing the original images with respective different enlargement or reduction ratios in the longitudinal and lateral directions, and the like. Further, the images equivalent to the original images may be images created by inclining and enlarging or reducing the original images.

As illustrated in FIG. 8, the control unit 10 creates a moving-image file FA containing the image data v1 to v10, the evaluation values i1 to i10, and file information fi. In the present example, the file information fi includes the bookmark data bd1 and bd2, and the characteristic image data sv3 and sv9. The moving-image file FA created as described above is stored in the storage unit 40.

The file information fi further includes information indicating a file name and a data storage format, and the like, for example. The aforementioned image recording process and the aforementioned file storage process are repeated, thus resulting in storage of a plurality of moving-image files FA, FB, FC, and FD in the storage unit 40 in FIG. 1.

In the present embodiment, the aforementioned moving-image files are created in a container format, such as AVI (Audio Video Interleave), WMV (Windows (registered trademark) Media Video), MPEG (Moving Picture Experts Group), or the like. In this case, the bookmark data bd1 and bd2 and the characteristic image data sv3 and sv9 may be contained in the moving-image file as meta data.

(2-4) Image-Recording-Unit Reproduction Process

Next, an image-recording-unit reproduction process will be described. In the image-recording-unit reproduction process according to the present embodiment, images of a plurality of frames based on moving-image data stored in the image-recording unit 30 are displayed on the display unit 20 as moving images.

After an image recording process but before a file storage process, if the user operates the reproduction button Sg in FIG. 6 using the operation unit 4, the control unit 10 successively stores, into the video memory 50, image data of a plurality of frames in the moving-image data storage area 30A. Thus, images based on the image data which have been successively stored in the video memory 50 are displayed in the image display area Sa. Thus, a moving image is reproduced, based on the image data of the plurality of frames in the moving-image data storage area 30A.

Further, the control unit 10 stores, into the video memory 50, the waveform data in the waveform-data storage area 30B. Thus, a graph of a waveform based on the waveform data is displayed in the waveform display area Sb.

(2-5) Selective Reproduction Process

Next, a selective reproduction process will be described. The selective reproduction process according to the present embodiment is adapted to mainly display, as a moving image, on the display unit 20, images of a plurality of frames starting from an image of a frame selected using a thumbnail image, out of image data of a plurality of frames in moving-image files stored in the storage unit 40.

Respective icons corresponding to a plurality of moving-image files, which have been stored in the storage unit 40 through file storage processes, are displayed on the display unit 20 in FIG. 1. In this case, the user can select, by using the operation unit 4, any of the plurality of icons being displayed on the display unit 20 to select, as a target file, the moving-image file selected out of the plurality of moving-image files stored in the storage unit 40. If a target file is selected, a selective reproduction process is started.

Figure 9:
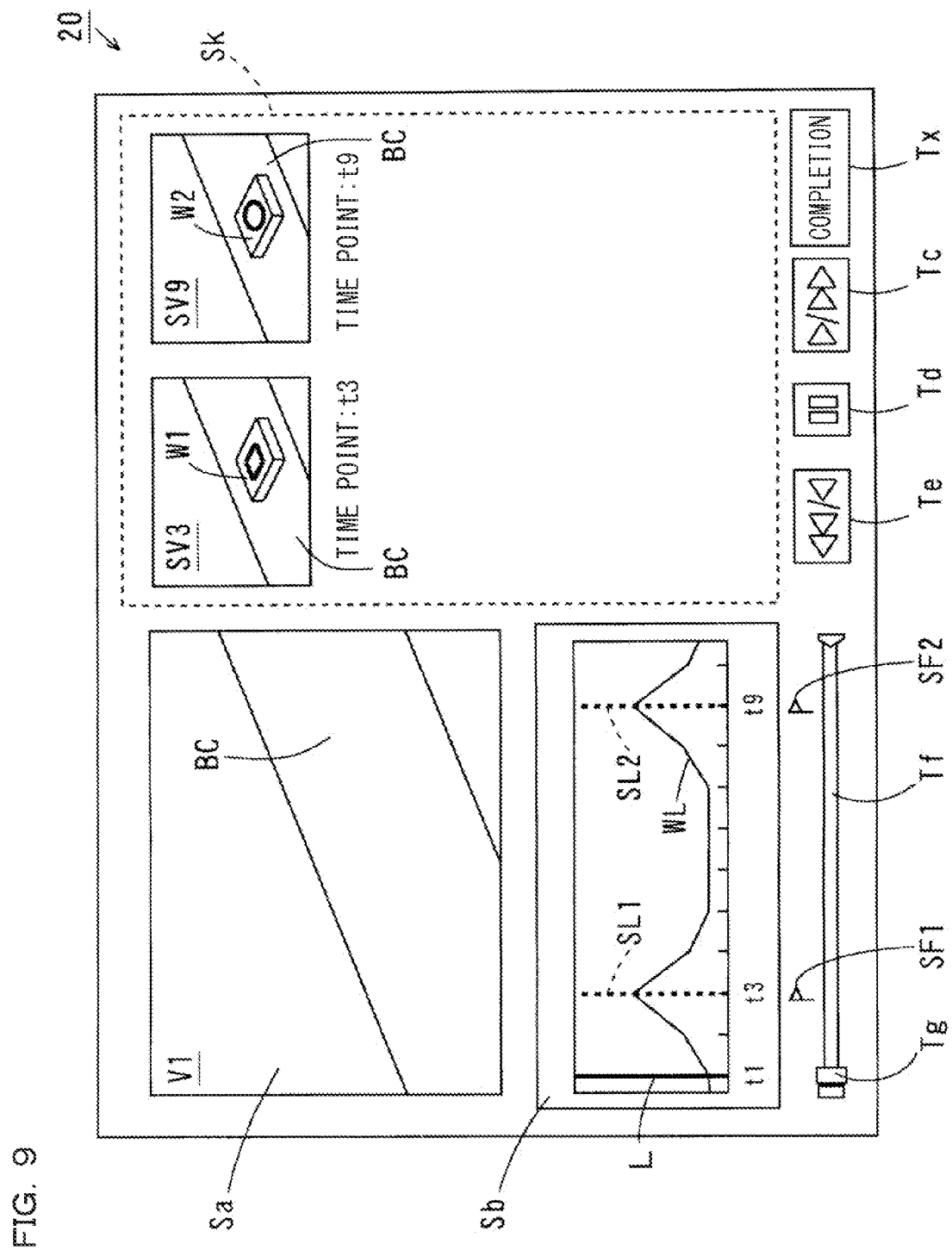
FIG. 9 is a view illustrating an exemplary display on the display unit during a selective reproduction process.
Figure 10:
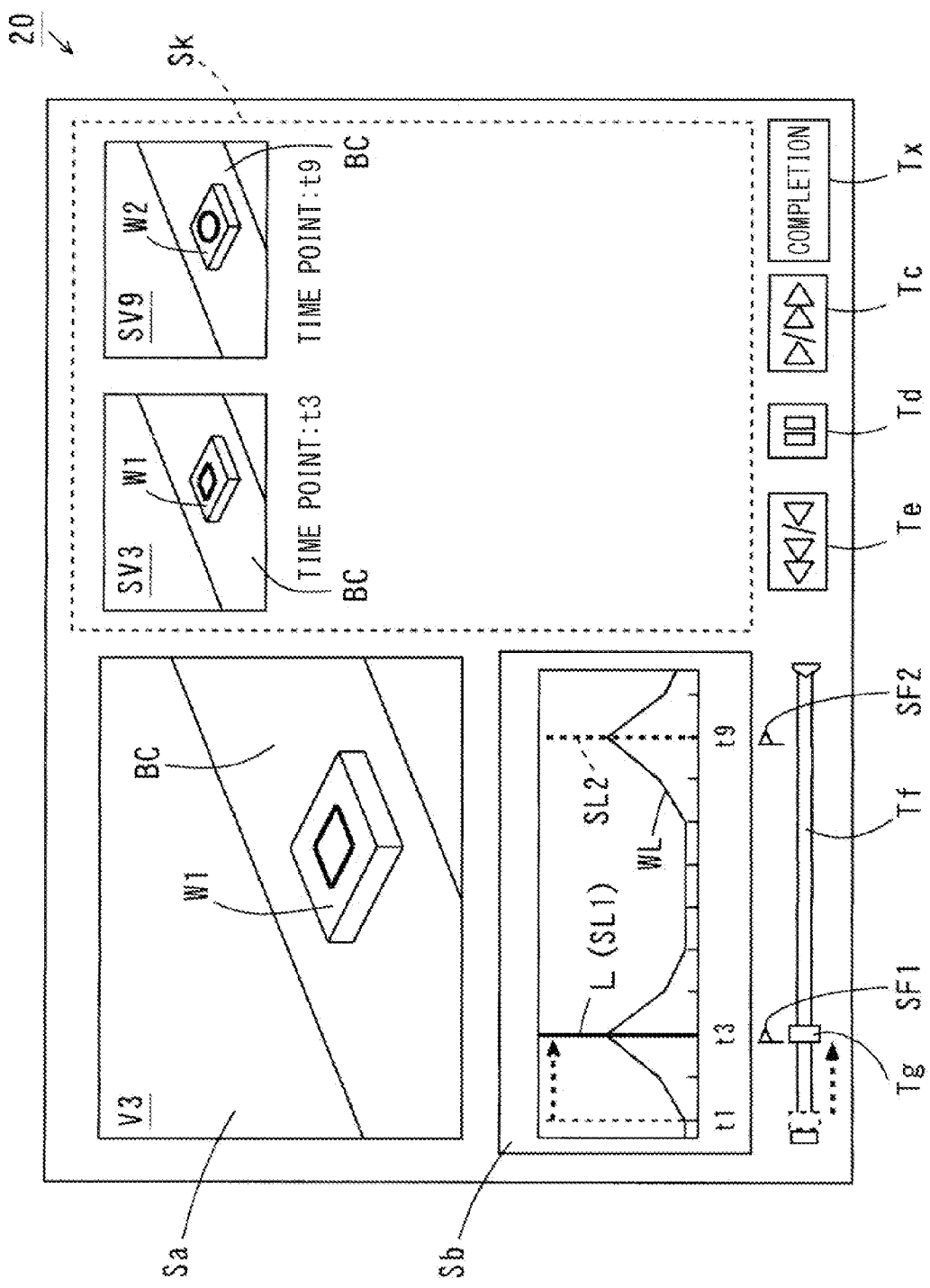
FIG. 10 is a view illustrating an exemplary display on the display unit during the selective reproduction process.
Figure 11:
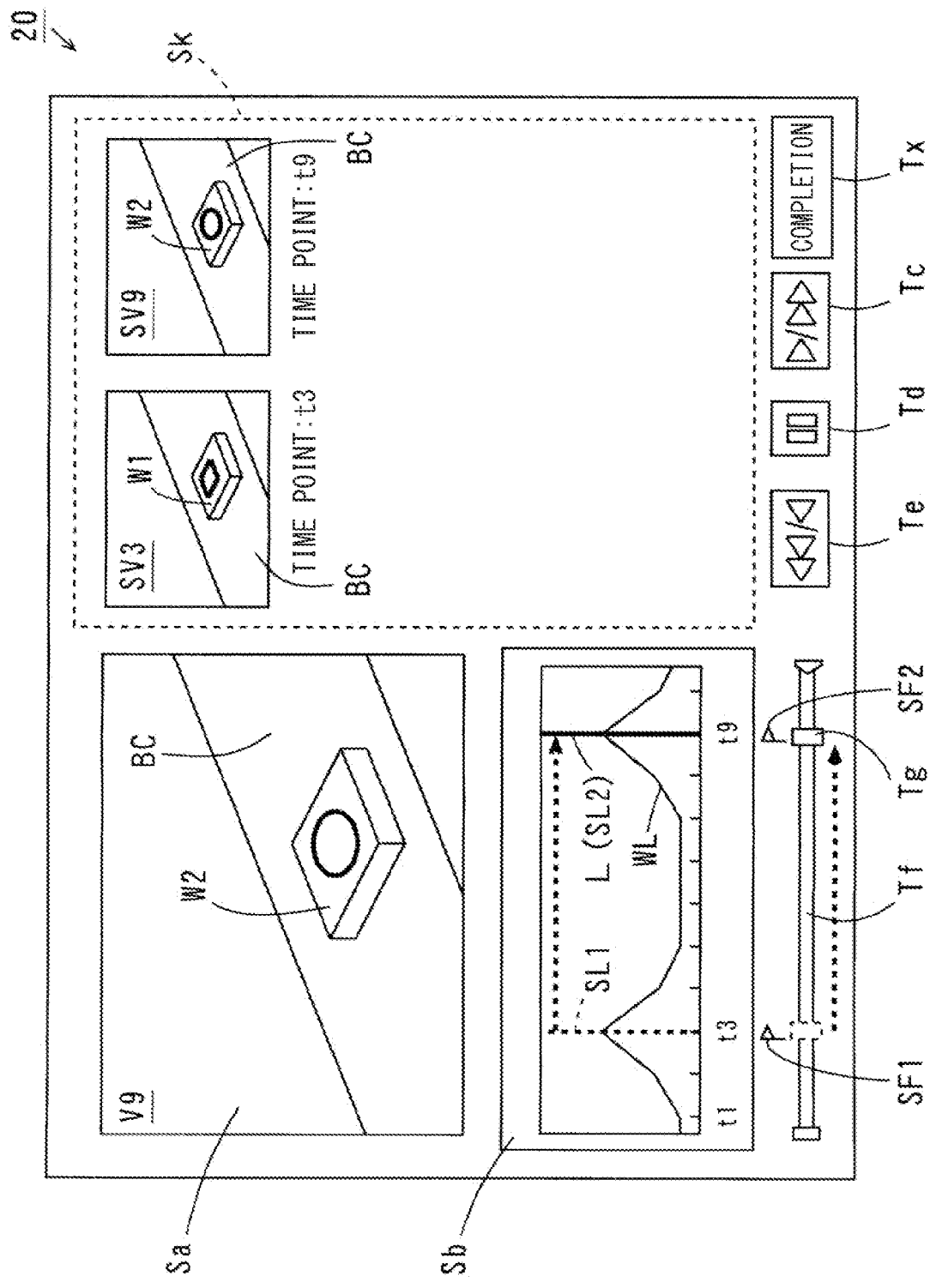
FIG. 11 is a view illustrating an exemplary display on the display unit during the selective reproduction process.

FIGS. 9 to 11 are views illustrating exemplary displays on the display unit 20 during a selective reproduction process. In the present example, the user selects, as a target file, the moving-image file FA in FIG. 8, using the operation unit 4.

In this case, as illustrated in FIG. 9, the image display area Sa, the waveform display area Sb, a thumbnail display area Sk, a reproduction button Tc, a pause button Td, a reverse reproduction button Te, a seek bar Tf, and a completion button Tx are mainly displayed, on the display unit 20 in FIG. 1. The seek bar Tf includes a slider Tg movable in the horizontal direction.

Images based on the image data of the respective frames in the target file are displayed in the image display area Sa. A graph of a waveform WL based on the waveform data in the target file is displayed in the waveform display area Sb. The horizontal axis in the graph of the waveform WL is a time axis, while the vertical axis represents the evaluation values.

In the waveform display area Sb, a current display position bar L is displayed by being superimposed on the graph, in parallel with the vertical axis so as to intersect with the waveform WL. Thus, during the selective reproduction process, the current display position bar L designates the evaluation value corresponding to the frame of the image being currently displayed in the image display area Sa. In the example of FIG. 9, the current display position bar L is displayed at the position of a time point t1 on the time axis, in the waveform display area Sb.

In the present example, the target file contains the bookmark data bd1 indicating the image data v3 of the third frame, and the bookmark data bd2 indicating the image data v9 of the ninth frame.

In this case, in the waveform display area Sb, respective bookmark bars SL1 and SL2 corresponding to the two bookmark data bd1 and bd2 are displayed by being superimposed on the graph. The bookmark bars SL1 and SL2 are in parallel with the vertical axis and intersect with the waveform WL. The bookmark bars SL1 and SL2 designate the positions on the waveform WL which correspond to the image data v3 and the image data v9. In the example of FIG. 9, the bookmark bars SL1 and SL2 are displayed at the respective positions of time points t3 and t9 on the time axis, in the waveform display area Sb.

In the thumbnail display area Sk, thumbnail images SV3 and SV9 are listed. The thumbnail images SV3 and SV9 are images created by reducing the images V3 and V9 corresponding to the image data v3 and v9 of the third and ninth frames which are indicated by the respective bookmark data bd1 and bd2. Further, in the thumbnail display area Sk, below the thumbnail images SV3 and SV9, the positions of the bookmark bars SL1 and SL2 being displayed in the waveform display area Sb (the time points t3 and t9, in the present example) are displayed.

As described above, the seek bar Tf includes the slider Tg movable in the horizontal direction. The position of the slider Tg corresponds to the position of the current display position bar L being displayed in the waveform display area Sb at the current time point, on the time axis.

In the example of FIG. 9, bookmark flags SF1 and SF2 corresponding to the respective bookmark data bd1 and bd2 are displayed above the seek bar Tf. The positions of the bookmark flags SF1 and SF2 correspond to the positions, on the time axis, of the image data v3 and v9 of the third and ninth frames, which are indicated by the bookmark data bd1 and bd2, respectively.

The user operates the reproduction button Tc, using the operation unit 4. In this case, the images of the plurality of frames starting from the image being displayed at the current time point, based on the moving-image data in the target file, are successively displayed in the image display area Sa. Thus, the moving image is reproduced.

As the reproduction of the moving image proceeds, the current display position bar L moves in a single direction (in the left-to-right direction in the screen of the display unit 20, in the present example) along the time axis in the waveform display area Sb, and also, the slider Tg moves in a single direction (in the left-to-right direction in the screen of the display unit 20, in the present example) on the seek bar Tf.

Further, the user operates the reverse reproduction button Te, using the operation unit 4. In this case, the images of the plurality of frames starting from the image being displayed at the current time point, based on the moving-image data in the target file, are successively displayed in the image display area Sa, in the direction opposite from that of reproduction along the time axis. Thus, the moving image is reversely reproduced.

As the reverse reproduction of the moving image proceeds, the current display position bar L moves in a different direction (in the right-to-left direction in the screen of the display unit 20, in the present example) along the time axis in the waveform display area Sb, and also, the slider Tg moves in a different direction (in the right-to-left direction in the screen of the display unit 20, in the present example) on the seek bar Tf.

During reproduction or reverse reproduction of the moving image, if the user operates the pause button Td using the operation unit 4, the reproduction or the reverse reproduction of the moving image is temporarily stopped. Further, if the user continuously operates the reproduction button Tc, the moving image is reproduced at a higher speed until this operation is canceled. If the user continuously operates the reverse reproduction button Te, the moving image is reversely reproduced at a higher speed until this operation is canceled.

In this case, during the selective reproduction process, the user can select, by using the operation unit 4, one of the two thumbnail images SV3 and SV9 being displayed in the thumbnail display area Sk, and one of the bookmark bars SL1 and SL2 being displayed in the waveform display area Sb.

In the example of FIG. 9, the image V1 of the first frame is being displayed in the image display area Sa, the current display position bar L is being displayed at the position of the time point t1 on the time axis in the waveform display area Sb, and the slider Tg is being displayed at one end portion of the seek bar Tf. In this state, the user selects one thumbnail image SV3, using the operation unit 4.

As a result thereof, as illustrated in FIG. 10, the image V3 of the third frame corresponding to the thumbnail image SV3 is displayed in the image display area Sa, in place of the image V1 of the first frame. Further, as indicated by a dotted-line arrow in FIG. 10, the current display position bar L moves from the position of the time point t1 to the position of the time point t3 at which the bookmark bar SL1 is positioned, on the time axis in the waveform display area Sb. Further, as indicated by a dotted-line arrow in FIG. 10, the slider Tg moves, on the seek bar Tf, from the one end portion of the seek bar Tf to the position at which the bookmark flag SF1 is displayed.

If the reproduction button Tc is operated in this state, the images of the plurality of frames starting from the image V3 being displayed in the image display area Sa are successively displayed in the image display area Sa. On the other hand, if the reverse reproduction button Te is operated, the images of the plurality of frames starting from the image V3 being displayed in the image display area Sa are successively displayed in the image display area Sa, in the direction opposite from that of reproduction along the time axis.

As described above, the user can reproduce or reversely reproduce the moving images before and after the image V3 corresponding to the thumbnail image SV3.

The one thumbnail image SV3 displayed in the thumbnail display area Sk and the one bookmark bar SL1 displayed in the waveform display area Sb are displayed, based on the bookmark data bd1.

Therefore, in cases where the user selects the one bookmark bar SL1, instead of selecting the one thumbnail image SV3, the image displayed in the image display area Sa, the position of the current display position bar L on the time axis in the waveform display area Sb, and the position of the slider Tg on the seek bar Tf are changed in the same way as described above.

Further, in the state of FIG. 10, the user selects the other thumbnail image SV9, using the operation unit 4.

As a result thereof, as illustrated in FIG. 11, the image V9 of the ninth frame corresponding to the thumbnail image SV9 is displayed in the image display area Sa, instead of the image V3 of the third frame. Further, as indicated by a dotted-line arrow in FIG. 11, the current display position bar L moves from the position of the time point t3 to the position of the time point t9 at which the bookmark bar SL2 is positioned, on the time axis in the waveform display area Sb. Further, as indicated by a dotted-line arrow in FIG. 11, the slider Tg moves, on the seek bar Tf, from the position at which the bookmark flag SF1 is displayed, to the position at which the bookmark flag SF2 is displayed.

If the reproduction button Tc is operated in this state, the images of the plurality of frames starting from the image V9 being displayed in the image display area Sa are successively displayed in the image display area Sa. On the other hand, if the reverse reproduction button Te is operated, the images of the plurality of frames starting from the image V9 being displayed in the image display area Sa are successively displayed in the image display area Sa, in the direction opposite from that of reproduction along the time axis.

As described above, the user can reproduce or reversely reproduce the moving images before and after the image V9 corresponding to the thumbnail image SV9.

The other thumbnail image SV9 displayed in the thumbnail display area Sk and the other bookmark bar SL2 displayed in the waveform display area Sb are displayed, based on the bookmark data bd2.

Therefore, in cases where the user operates the other bookmark bar SL2, instead of operating the other thumbnail image SV9, the image displayed in the image display area Sa, the position of the current display position bar L on the time axis in the waveform display area Sb, and the position of the slider Tg on the seek bar Tf are changed in the same way as described above.

During the selective reproduction process, the user can move the slider Tg on the seek bar Tf, by operating the operation unit 4. For example, the user can change the image displayed in the image display area Sa and the position of the current display position bar L on the time axis in the waveform display area Sb, in the same way as described above, by moving the slider Tg on the seek bar Tf using the operation unit 4.

Accordingly, the user can easily display the images V3 and V9 showing the subjects W1 and W2 in the image display area Sa, by moving the slider Tg on the seek bar Tf to the positions of the bookmark flags SF1 and SF2. Further, the user can reproduce or reversely reproduce the moving images before and after the images V3 and V9.

If the user operates the completion button Tx in FIGS. 9 to 11 using the operation unit 4, the selective reproduction process is completed.

While there has been described a case where "2" is inputted in the input frame Sc6 in FIG. 6, natural numbers other than 2 may be inputted in the input frame Sc6 in FIG. 6. For example, assuming that "n" is an arbitrary natural number, if "n" is inputted in the input frame Sc6, the control unit 10 sets the selection upper-limit number to "n".

Therefore, during file storage processes, image data of n frames are selected based on waveform data stored in the waveform-data storage area 30B, and n pieces of bookmark data indicating the selected image data of the n frames are created.

Thus, during reproduction processes, n thumbnail images corresponding to the image data of n frames indicated by n pieces of bookmark data are displayed in the thumbnail display area Sk.

(2-6) Flow of File Storage Process

Figure 12:
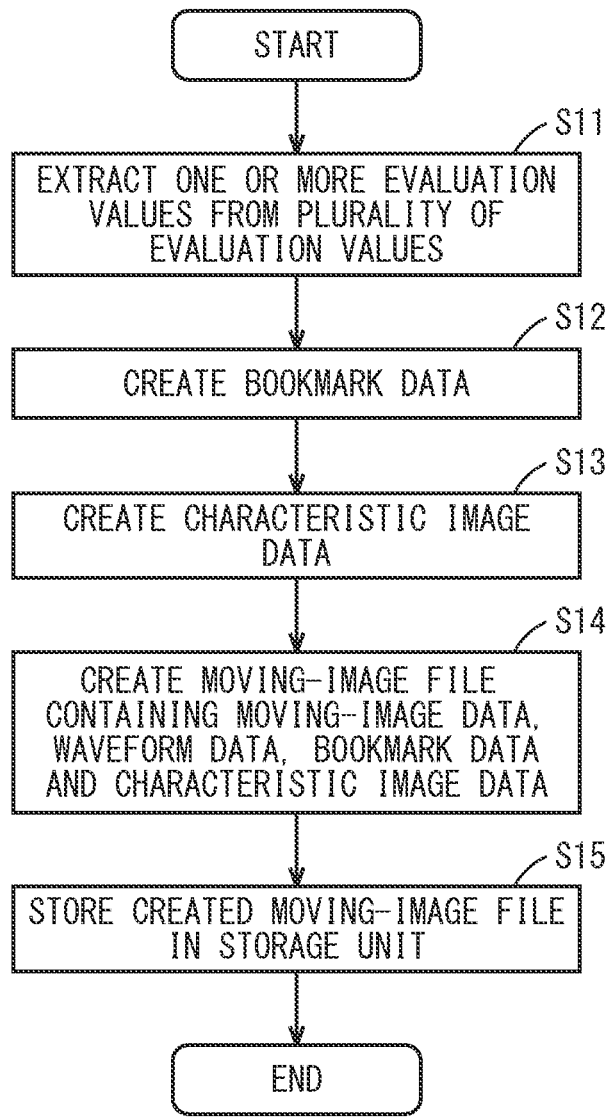
FIG. 12 is a flow chart of a file storage process.

FIG. 12 is a flow chart of a file storage process. As described above, the file storage process is started if the user operates the file button Sj in FIG. 6 using the operation unit 4, when an image-recording process has been completed. The control unit 10 performs the file storage process, by executing the image processing program stored in the storage unit 40.

Since the file storage process is started, the control unit 10 in FIG. 1 acquires a plurality of evaluation values stored in the image recording unit 30 in FIG. 1, and further, extracts one or more evaluation values indicating a predetermined characteristic, out of the acquired plurality of evaluation values (step S11).

Next, the control unit 10 creates bookmark data indicating the image data of the frames corresponding to the extracted evaluation values (step S12). Further, the control unit 10 creates characteristic image data corresponding to the image data indicated by the bookmark data (step S13).

Subsequently, the control unit 10 creates a moving-image file containing image data of a plurality of frames stored in the image recording unit 30, the plurality of evaluation values, the created bookmark data, and the created characteristic image data (step S14), and stores the created moving-image file in the storage unit 40 (step S15). Thus, the file storage process has been completed.

(2-7) Flow of Selective Reproduction Process

Figure 13:
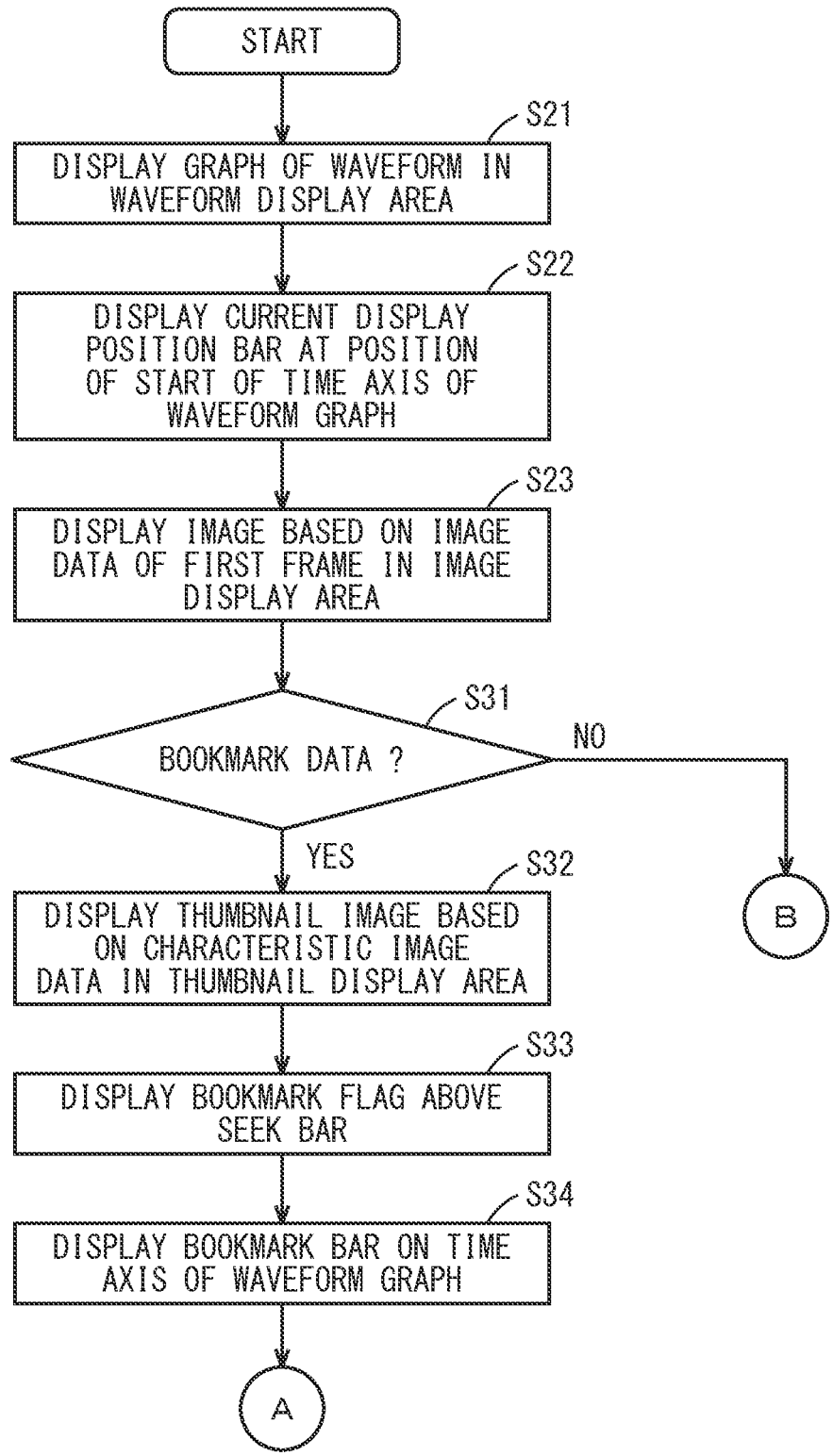
FIG. 13 is a flow chart of the selective reproduction process.
Figure 14:
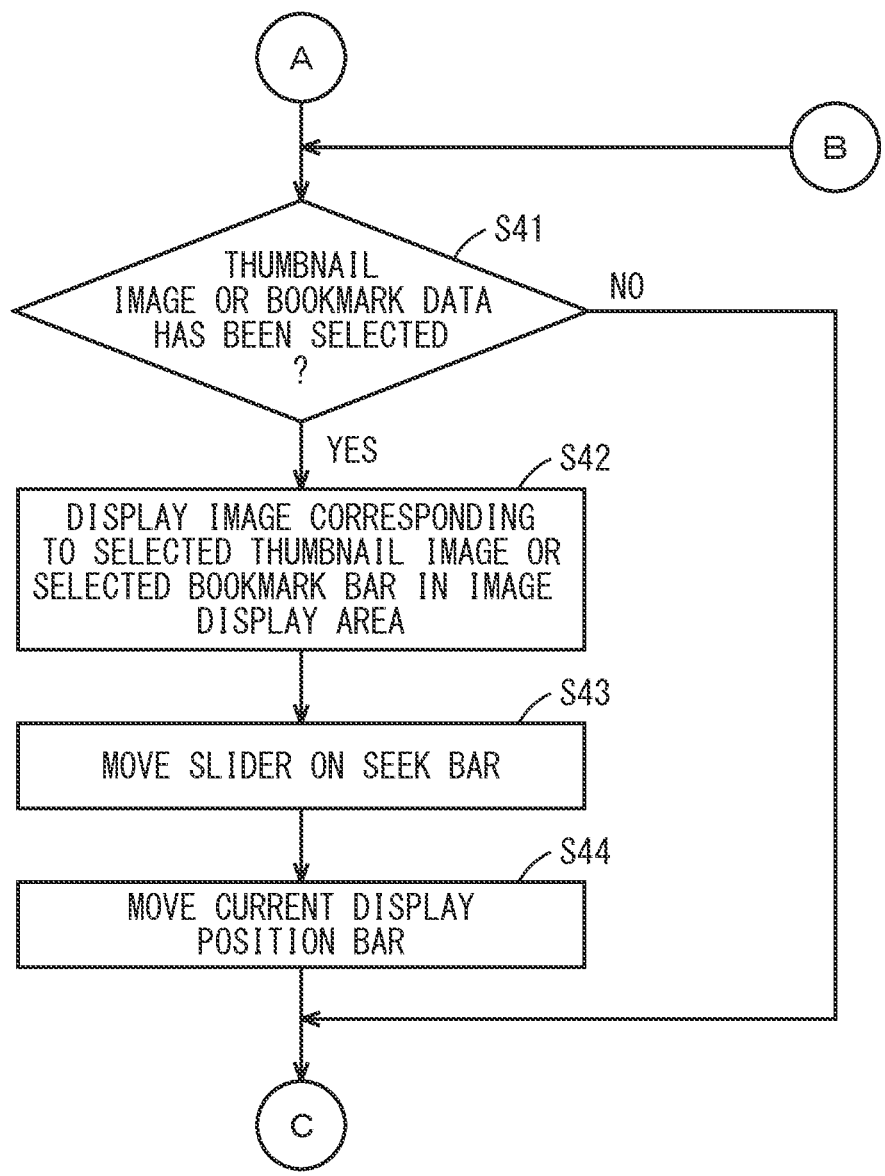
FIG. 14 is a flow chart of the selective reproduction process.
Figure 15:
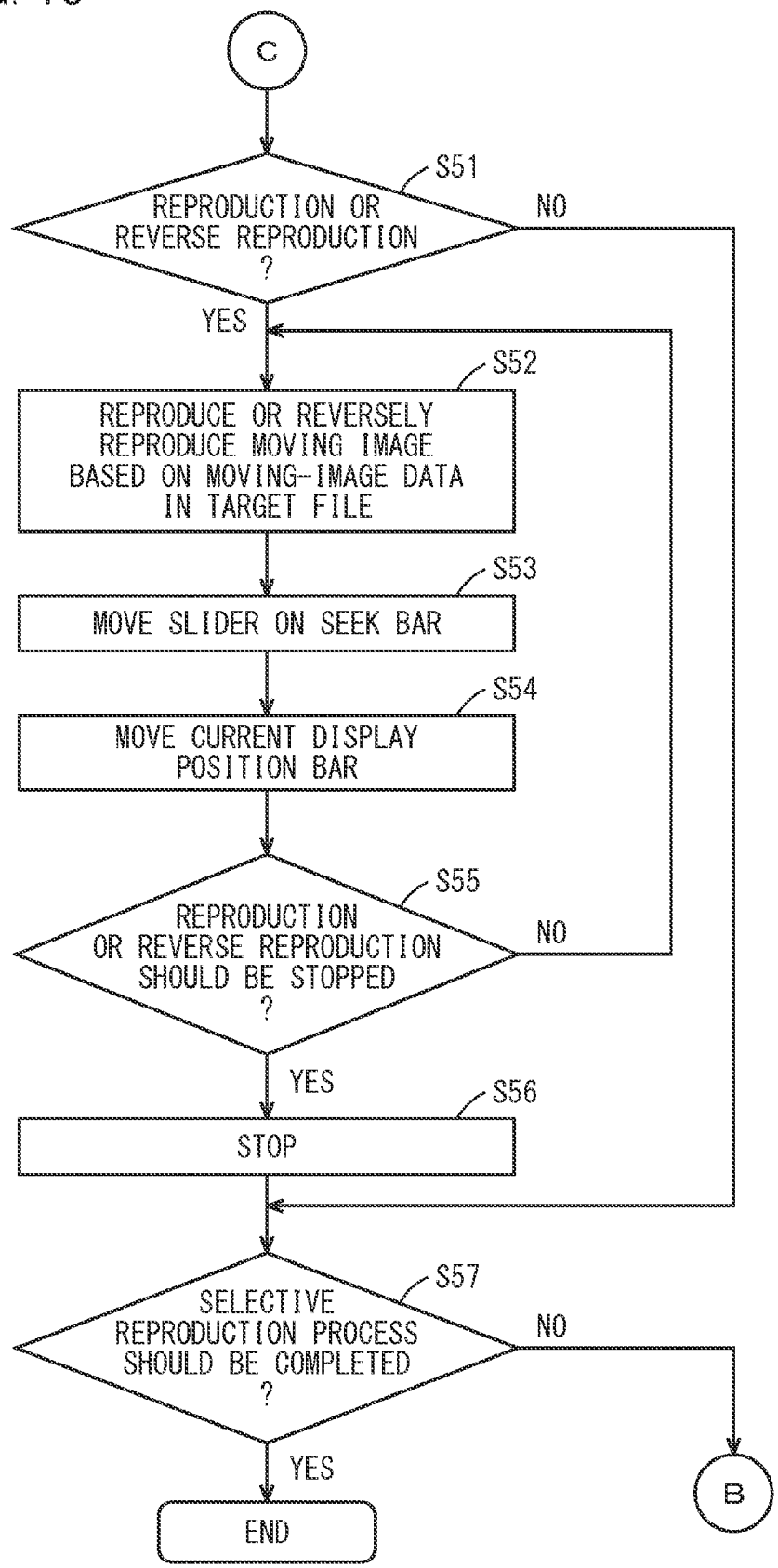
FIG. 15 is a flow chart of the selective reproduction process.

FIGS. 13 to 15 are a flow chart of a selective reproduction process. As described above, the selective reproduction process is started if the user selects a target file, out of a plurality of moving-image files stored in the storage unit 40, using the operation unit 4. The control unit 10 performs the selective reproduction process, by executing the image processing program stored in the storage unit 40.

Since the selective reproduction process is started, the control unit 10 in FIG. 1 displays a graph of a waveform WL (FIG. 9) based on the waveform data in the target file, in the waveform display area Sb (step S21).

Further, the control unit 10 displays the current display position bar L at the position of the start of the time axis, by superimposing it on the graph of the waveform WL, in the waveform display area Sb (step S22).

Further, the control unit 10 displays, in the image display area Sa (FIG. 9), the image based on the image data of the first frame in the target file (the image of the frame corresponding to the position on the waveform WL which is being designated by the current display position bar L) (step S23).

Subsequently, the control unit 10 determines whether or not the file information fi in the target file includes bookmark data bd1 and bd2 (FIG. 8) (step S31). If it includes no bookmark data bd1 and bd2, the control unit 10 proceeds to processing in step S41, which will be described later.

On the other hand, if it includes bookmark data bd1 and bd2, the control unit 10 displays, in the thumbnail display area Sk, thumbnail images based on the characteristic image data sv3 and sv9 (FIG. 8) included in the file information fi (step S32).

Further, the control unit 10 displays bookmark flags SF1 and SF2, above the seek bar Tf, at the positions which correspond to the image data of the frames indicated by the respective bookmark data bd1 and bd2 (step S33).

Further, the control unit 10 displays bookmark bars SL1 and SL2, at the positions on the time axis which correspond to the image data of the frames indicated by the respective bookmark data bd1 and bd2, in the graph of the waveform WL in the waveform display area Sb (step S34).

Subsequently, the control unit 10 determines whether or not one of the thumbnail images SV3 and SV9 being listed in the thumbnail display area Sk in FIG. 9 or one of the bookmark bars SL1 and SL2 being displayed in the waveform display area Sb has been selected (step S41). If none of the thumbnail images SV3 and SV9 and the bookmark bars SL1 and SL2 has been selected, the control unit 10 proceeds to processing in step S51, which will be described later.

If one of the thumbnail images SV3 and SV9 or one of the bookmark bars SL1 and SL2 has been selected, the control unit 10 displays the image of the frame corresponding to the selected thumbnail image or the selected bookmark bar, in the image display area Sa, based on the image data (step S42).

Further, the control unit 10 moves the slider Tg on the seek bar Tf to the position of the bookmark flag which corresponds to the selected thumbnail image or the selected bookmark bar (step S43).

Further, the control unit 10 moves the current display position bar L along the time axis of the graph of the waveform WL, to the position of the bookmark bar corresponding to the selected thumbnail image or the selected bookmark bar, in the waveform display area Sb (step S44).

Subsequently, the control unit 10 determines whether or not a command for reproduction or reverse reproduction of the moving image has been issued, through an operation on the reproduction button Tc or the reverse reproduction button Te in FIG. 9 (step S51). If no command for reproduction or reverse reproduction of the moving image has been issued, the control unit 10 proceeds to processing in step S57, which will be described later.

If a command for reproduction or reverse reproduction of the moving image has been issued, the control unit 10 reproduces or reversely reproduces the moving image based on the moving-image data in the target file (step S52). Further, the control unit 10 moves the slider Tg on the seek bar Tf according to the frames of the images being displayed in the image display area Sa along with the reproduction or the reverse reproduction of the moving image (step S53), and also, moves the current display position bar L along the time axis in the waveform display area Sb (step S54).

In this state, the control unit 10 determines whether or not a command for stopping of the reproduction or the reverse reproduction has been issued through an operation on the pause button Td in FIG. 9 (step S55). If a command for stopping of the reproduction or the reverse reproduction has been issued, the control unit 10 stops the reproduction or the reverse reproduction of the moving image based on the moving-image data in the target file (step S56).

Thereafter, the control unit 10 determines whether or not a command for completion of the selective reproduction process has been issued, through an operation on the completion button Tx in FIG. 9 (step S57). If a command for completion of the selective reproduction process has been issued, the control unit 10 completes the selective reproduction process. On the other hand, if no command for completion of the selective reproduction process has been issued, the control unit 10 returns to the processing in step S41 described above.

As described above, in cases where moving-image files contain bookmark data and characteristic image data, as meta data, even the aforementioned image processing device 1 that does not have the function of executing selective reproduction processes is capable of reproducing and reversely reproducing moving images, but only moving images are displayed on the display unit 20. Accordingly, graphs of waveforms WL, bookmark bars, and thumbnail images are not displayed in the screen in the display unit 20.

(2-8) Effects

With the image processing device 1 according to the present embodiment, if a target file is selected in selective reproduction processes, evaluation values i3 and i9 (FIG. 7) indicating a predetermined characteristic are extracted, out of a plurality of evaluation values i1 to i9 (FIG. 7) in the target file. Based on the extracted evaluation values i3 and i9, image data v3 and v9 of some frames are selected, out of image data v1 to v10 of a plurality of frames. Characteristic image data sv3 and sv9 corresponding to the selected image data v3 and v9 are created. Thumbnail images SV3 and SV9 based on the characteristic image data sv3 and sv9 are listed in the thumbnail display area Sk.

In this case, the evaluation values are varied according to the state of a subject W in the images of the plurality of frames. Accordingly, the images V3 and V9 based on the selected image data v3 and v9 show a certain state of the subject W.

If the user selects any of the thumbnail images SV3 and SV9 being displayed in the thumbnail display area Sk using the operation unit 4, the image corresponding to the selected thumbnail image is displayed in the image display area Sa. In this state, the user can immediately and easily reproduce the moving image showing the certain state of the subjects W, by operating the reproduction button Tc using the operation unit 4.

Further, a graph of a waveform WL formed from the plurality of evaluation values i1 to i10 is displayed in the waveform display area Sb, on the display unit 20. In this graph, on the time axis, bookmark bars SL1 and SL2 corresponding to the selected image data v3 and v9 are displayed. The bookmark bars SL1 and SL2 designate the positions on the waveform WL which correspond to the image data v3 and v9.

This enables the user to recognize the state of the subject W shown by the images V1 to V10 of the plurality of frames, by viewing the waveform WL. Further, if the user selects one of the bookmark bars SL1 and SL2 using the operation unit 4, the image corresponding to the selected bookmark bar is displayed in the image display area Sa. In this state, the user can immediately and easily reproduce the moving image showing the certain state of the subject W, by operating the reproduction button Tc using the operation unit 4.

(3) Others

In selective reproduction processes, image data of some frames can be newly selected, out of image data of a plurality of frames, based on user's operations on the operation unit 4. In this case, the control unit 10 creates bookmark data indicating the image data of the some frames selected by the user, and further, creates characteristic image data corresponding to the bookmark data.

Figure 16:
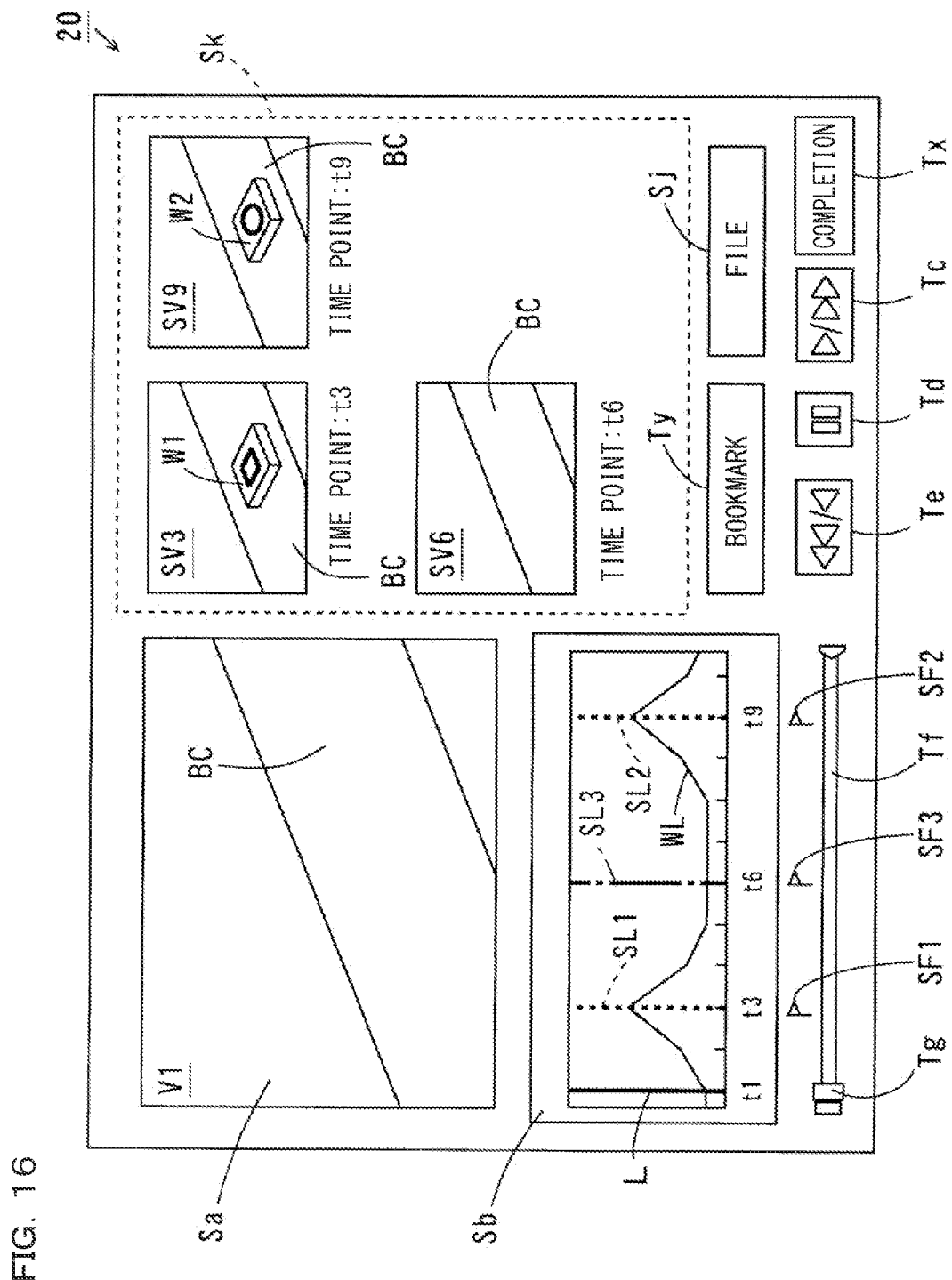
FIG. 16 is a view illustrating another exemplary display on the display unit during the selective reproduction process.

FIG. 16 is a view illustrating another exemplary display on the display unit 20 during a selective reproduction process. In the exemplary display in FIG. 16, a bookmark button Ty and a file button Sj are further displayed on the display unit 20, in addition to the exemplary display in FIGS. 9 to 11.

As illustrated in the exemplary display in FIGS. 9 to 11, in a state where two bookmark bars SL1 and SL2 are displayed on the time axis of a graph of a waveform WL, and two thumbnail images SV3 and SV9 are listed in the thumbnail display area Sk, the user operates the bookmark button Ty, using the operation unit 4.

This enables designating an arbitrary position on the time axis of the graph of the waveform WL or an arbitrary position on the seek bar Tf, through the operation unit 4. In this state, the user designates the position of a time point t6, for example, on the time axis of the graph of the waveform WL, using the operation unit 4.

In this case, the control unit 10 selects image data v6 of a frame corresponding to the position on the time axis which has been designated by the user, out of image data of a plurality of frames. Further, the control unit 10 creates bookmark data indicating the image data v6, and characteristic image data corresponding to the bookmark data. Further, the control unit 10 displays a new bookmark bar SL3 at the position of the time point t6 on the time axis of the graph of the waveform WL. Further, the control unit 10 displays a new thumbnail image SV6 in the thumbnail display area Sk, based on the created characteristic image data.

In this state, the user operates the file button Sj using the operation unit 4 and, thus, the control unit 10 creates a moving-image file further containing the newly-created bookmark data and characteristic image data, and then, stores the created moving-image file in the storage unit 40.

As described above, in the present example, the control unit 10 creates bookmark data and characteristic image data, based on user's operations on the operation unit 4. This enables the user to immediately and easily search for desired images, regardless of the state of the subject W.

(4) Correspondence Between Respective Components in Claims and Respective Units in Embodiments Hereinafter, there will be described examples of correspondence between respective components in the claims and respective units in the embodiments, but the present invention is not intended to be restricted by the following examples.

In the aforementioned embodiments, the subjects W are an example of an object, the image data v1 to v10 are an example of first image data of a plurality of frames, the characteristic image data sv3 and sv9 are an example of second image data of a plurality of frames, and the images V1 to V10 are an example of first images of a plurality of frames.

Further, the image processing device 1 is an example of an image processing device, the evaluation values i1 to i10 are an example of a plurality of evaluation values, the storage unit 40 is an example of a storage unit, the image display area Sa is an example of a first display area, a thumbnail display area Sk is an example of a second display area, and the display unit 20 is an example of a display unit.

Further, the thumbnail images SV3, SV6, and SV9 are an example of second images, the control unit 10 is an example of a control unit, the operation unit 4 is an example of an operation unit, the waveform display area Sb is an example of a third display area, the waveform WL is an example of a waveform, and the bookmark bars SL1, SL2, and SL3 are an example of indicators.

Further, the sensors 6 and 8 and the waveform collection device 7 are an example of a detection device, the selection upper-limit number is an example of a predetermined number, the bookmark data bd1 and bd2 are an example of data indicating selected first image data, the moving-image files FA, FB, FC, and FD are an example of a moving-image file, and the control unit 10 is an example of a processing device.

As the respective components in the claims, it is also possible to employ other various types of components having the structures or the functions defined in the claims.

The present invention can be effectively applied to various types of image processes.

What is claimed is:

1. An image processing device for successively displaying a plurality of first images as a moving image of an object, comprising:
    a storage unit configured to store a plurality of first image data from a camera and to store a plurality of evaluation values associated with the plurality of first image data;
    a display unit including a first display area and a second display area;
    a control unit configured to control the display unit to successively display, in the first display area, a plurality of first images as a moving image based on the plurality of first image data stored in the storage unit, to select a first image data from the plurality of first image data based on the plurality of evaluation values stored in the storage unit, to create a second image data corresponding to the selected first image data, and to control the display unit to display, in the second display area, a second image based on the created second image data; and
    an operation unit being capable of selecting one of the second image displayed in the second display area by a user,
    wherein the plurality of evaluation values are values which are varied according to a state of the object,
    each of the second image represents the corresponding first image, and
    the control unit is configured to control the display unit to display the first image corresponding to the selected second image, in the first display area, in response to select one of the second image displayed in the second display area through the operation unit.

2. The image processing device according to claim 1, wherein the control unit is adapted to select the first image data corresponding to an evaluation value indicating a predetermined characteristic from the plurality of evaluation values.

3. The image processing device according to claim 1, wherein the second image is image created by reducing the corresponding first images.

4. The image processing device according to claim 1, wherein the display unit further includes a third display area, and the control unit is configured to control the display unit to display, in the third display area, a time domain waveform formed from the plurality of evaluation values stored in the storage unit, to identify the first image corresponding to the second image displayed in the second display area, and to control the display unit to display, in the third display area, indicators designating positions corresponding to the identified first image on the time domain waveform.

5. The image processing device according to claim 4, wherein the operation unit is adapted to select the indicators displayed in the third display area, and the control unit is configured to, when the indicator displayed in the third display area has been selected through the operation unit, identify the first image corresponding to the position designated by the selected indicator on the time domain waveform, and to control the display unit to display the identified first image in the first display area.

6. The image processing device according to claim 1, wherein the evaluation value represents characteristics of the first image.

7. The image processing device according to claim 6, wherein the value representing the characteristics of the first image is a value relating to luminance of the first image.

8. The image processing device according to claim 1, wherein the plurality of evaluation values are the values of outputs from a detection device for detecting a value which is varied with change of the state of the object.

9. The image processing device according to claim 1, wherein the operation unit is adapted to issue a command for reproduction and reverse reproduction of a moving image, and the control unit is configured to control the display unit to successively display, in the first display area, a plurality of first images as a moving image based on the plurality of first image data stored in the storage unit, when a command for reproduction or reverse reproduction of a moving image has been issued through the operation unit.

10. The image processing device according to claim 1, wherein the control unit is adapted to select a first image data from the plurality of first image data, based on the plurality of evaluation values stored in the storage unit, such that the number of the selected first image data is equal to or less than a predetermined number.

11. The image processing device according to claim 1, wherein the control unit is adapted to create a moving-image file containing the plurality of first image data, the plurality of evaluation values associated with the plurality of first image data, data indicating the selected first image data, and the second image data corresponding to the selected first image data, and is adapted to store the created image-moving file in the storage unit.

12. An image processing method for successively displaying a plurality of first images as a moving image of an object, in a first display area in a display unit, comprising the steps of;
  storing a plurality of first image data from a camera and storing a plurality of evaluation values associated with the plurality of first image data;
  successively displaying, in the first display area, a plurality of first images as a moving image based on the plurality of first image data;
  selecting a first image data from the plurality of first image data based on the plurality of evaluation value,
  creating a second image data corresponding to the selected first image data;
  displaying, in a second display area in the display unit, a second image based on the created second image data;
  selecting one of the second image displayed in the second display area by a user; and
  displaying the first image corresponding to the selected second image, in the first display area, in response to select one of the second image displayed in the second display area through the operation unit;
  wherein the plurality of evaluation values are values which are varied according to a state of the object,
  each of the second image represents the corresponding first image.

13. An image processing program for causing a processing device to execute image processing for successively displaying a plurality of first images as a moving image of an object, in a first display area in a display unit, the program being adapted to cause the processing device to execute the processes of; storing a plurality of first image data from a camera and storing a plurality of evaluation values associated with the plurality of first image data;
  successively displaying, in the first display area, a plurality of first images as a moving image based on the plurality of first image data;
  selecting a first image data from the plurality of first image data based on the plurality of evaluation values,
  creating a second image data corresponding to the selected first image data;
  displaying, in a second display area in the display unit, a second image based on the created second image data;
  selecting one of the second image displayed in the second display area by a user; and
  displaying the first image corresponding to the selected second image, in the first display area, in response to select one of the second image displayed in the second display area through the operation unit;
  wherein the plurality of evaluation values are values which are varied according to a state of the object,
  each of the second image represents the corresponding first image.

* * * * *